United States Patent [19]
Ryu et al.

[11] Patent Number: 5,408,608
[45] Date of Patent: Apr. 18, 1995

[54] DISTRIBUTED DATA BASE CONTROL CENTER HAVING A PLURALITY OF INFORMATION TABLES FOR FACILITATING A DIRECT COMMUNICATION AMONG TERMINAL UNITS OF A NETWORK

[75] Inventors: Tadamitsu Ryu, Yokohama; Yoshio Mogi, Tochigi; Takanori Fukatsu, Kawasaki; Gen Kakehi, Yokohama; Masahiko Murakawa, Kawasaki; Mamoru Endo, Sagamihara; Mitsuhiko Yamagata, Kuki; Katsuo Sato, Machida; Akira Hashimoto, Yokohama; Hiroshi Araki, Kawasaki; Yasumasa Takahashi, Tokyo, all of Japan

[73] Assignee: Fujitsu Limited, Kawasaki, Japan

[21] Appl. No.: 678,338

[22] PCT Filed: Sep. 11, 1990

[86] PCT No.: PCT/JP90/01161
§ 371 Date: May 8, 1991
§ 102(e) Date: May 8, 1991

[87] PCT Pub. No.: WO91/04532
PCT Pub. Date: Apr. 4, 1991

[30] Foreign Application Priority Data

| Sep. 14, 1989 | [JP] | Japan | 1-239450 |
| Sep. 14, 1989 | [JP] | Japan | 1-239452 |
| Dec. 26, 1989 | [JP] | Japan | 1-337035 |
| Dec. 27, 1989 | [JP] | Japan | 1-339369 |
| Jan. 12, 1990 | [JP] | Japan | 2-004809 |
| Mar. 7, 1990 | [JP] | Japan | 2-056036 |
| Mar. 7, 1990 | [JP] | Japan | 2-056037 |
| Mar. 7, 1990 | [JP] | Japan | 2-056038 |

[51] Int. Cl.⁶ ............................................. G06F 13/14
[52] U.S. Cl. .................... 395/200; 364/230.5; 364/282.4; 364/284.4; 395/600
[58] Field of Search ............ 395/200, 325, 600, 650; 380/4

[56] References Cited

U.S. PATENT DOCUMENTS

| 4,418,382 | 11/1983 | Larson et al. | 395/200 |
| 4,543,627 | 9/1985 | Schwab | 395/200 |
| 4,630,196 | 12/1986 | Bedmar, Jr. et al. | 395/200 |
| 4,698,766 | 10/1987 | Enwistle et al. | 364/468 |
| 4,714,992 | 12/1987 | Gladney et al. | 395/600 |
| 4,718,005 | 1/1988 | Feigenbaum et al. | 395/200 |
| 4,780,821 | 10/1988 | Crossley | 395/650 |
| 4,805,134 | 2/1989 | Calo et al. | 395/600 |
| 4,887,204 | 12/1989 | Johnson et al. | 395/600 |
| 4,924,378 | 5/1990 | Hershey et al. | 395/200 |
| 4,937,863 | 6/1990 | Robert et al. | 380/4 |
| 5,005,122 | 4/1991 | Griffin et al. | 395/200 |
| 5,023,907 | 6/1991 | Johnson et al. | 380/4 |
| 5,036,459 | 7/1991 | den Haan et al. | 395/200 |
| 5,079,767 | 1/1992 | Perlman | 370/94.3 |
| 5,138,712 | 8/1992 | Corbin | 395/700 |
| 5,247,670 | 9/1993 | Matsunaga | 395/650 |

FOREIGN PATENT DOCUMENTS

| 0204993 | 12/1986 | European Pat. Off. |
| 0205945 | 12/1986 | European Pat. Off. |
| 0213277 | 3/1987 | European Pat. Off. |
| 62-125445 | 6/1987 | Japan |
| 62-163155 | -7/1987 | Japan |
| 62-192850 | 8/1987 | Japan |
| 62-284439 | 12/1987 | Japan |
| 1-70860 | 3/1989 | Japan |

OTHER PUBLICATIONS

Mannescu; "Inter-Process Communication in MVS/XA and applications for Scientific and Engineering Information Processing", Software-Practice vol. 16 (5), pp. 489-501, May 1986.

Raphael; "Join Micros Into Intelligent Networks", Electronic Design 5 Mar. 1, 1975, pp. 52-57.

*Primary Examiner*—Parshotam S. Lall
*Assistant Examiner*—Krisna Lim
*Attorney, Agent, or Firm*—Staas & Halsey

[57] ABSTRACT

A distributed data base system is formed by terminal units connected in a public network or a private network. Each terminal unit stores respectively the real data and a temporary center for storing the one or a (Abstract continued on next page.)

plurality of control information among various pieces of control information, such as contents corresponding to each real data, keyword or command assigned to data. Moreover, check information set up for acquiring security is provided as the one of the terminal unit. A terminal unit utilizing data obtains identification information of terminal units storing relevant real data by inputting contents, commands or keywords by accessing the center and reading or extracting the necessary real data through the network from a terminal unit having real data based on such identification information but is capable of restricting users (terminal units) which are allowed to read the open data in accordance with the degree of importance of the data.

This center, when it is assigned to the one terminal unit forming a distributed data base system, executes the control by gathering necessary control information from each terminal unit. This center having control information may be realized by the one terminal unit, but a center may also be provided individually corresponding to the items of information to be controlled. Moreover, the center may be established in one terminal unit and the center may be changed to the other terminal unit from the one terminal unit.

2 Claims, 32 Drawing Sheets

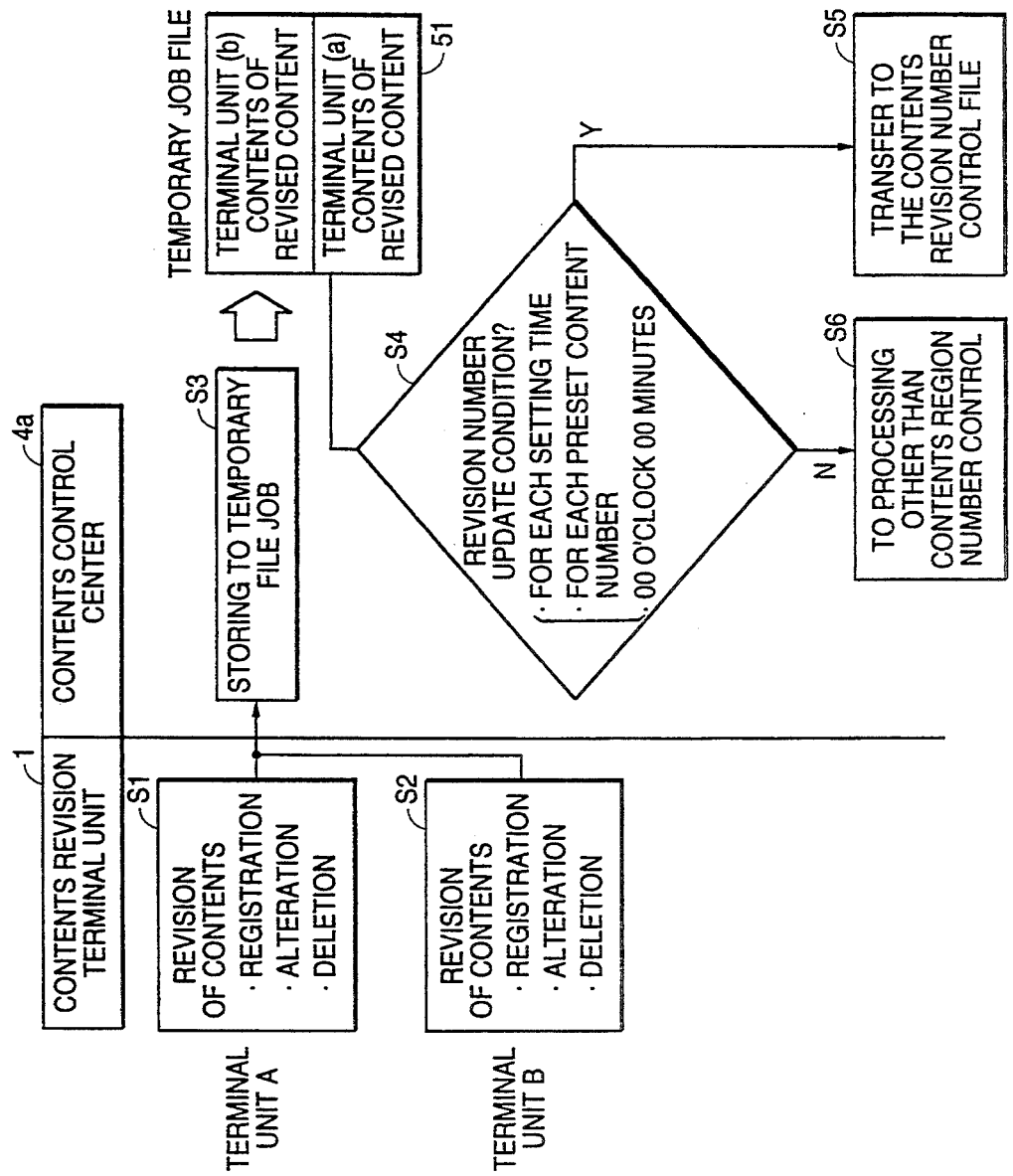

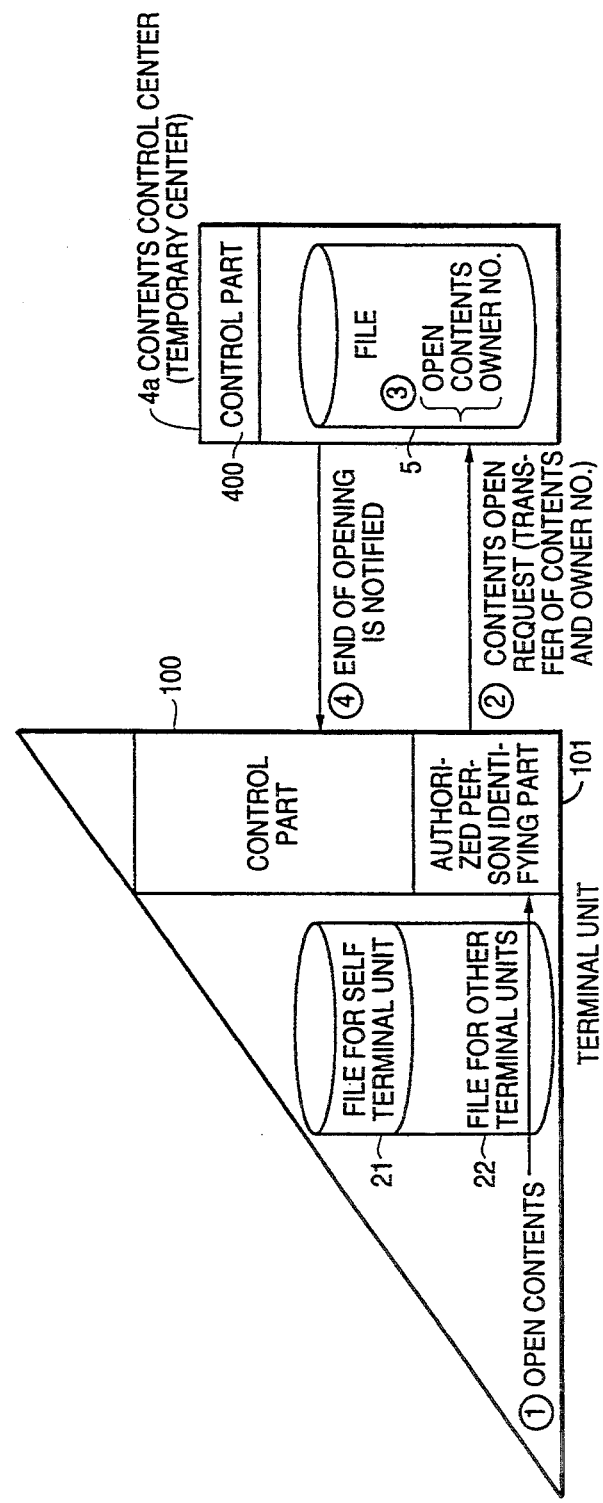

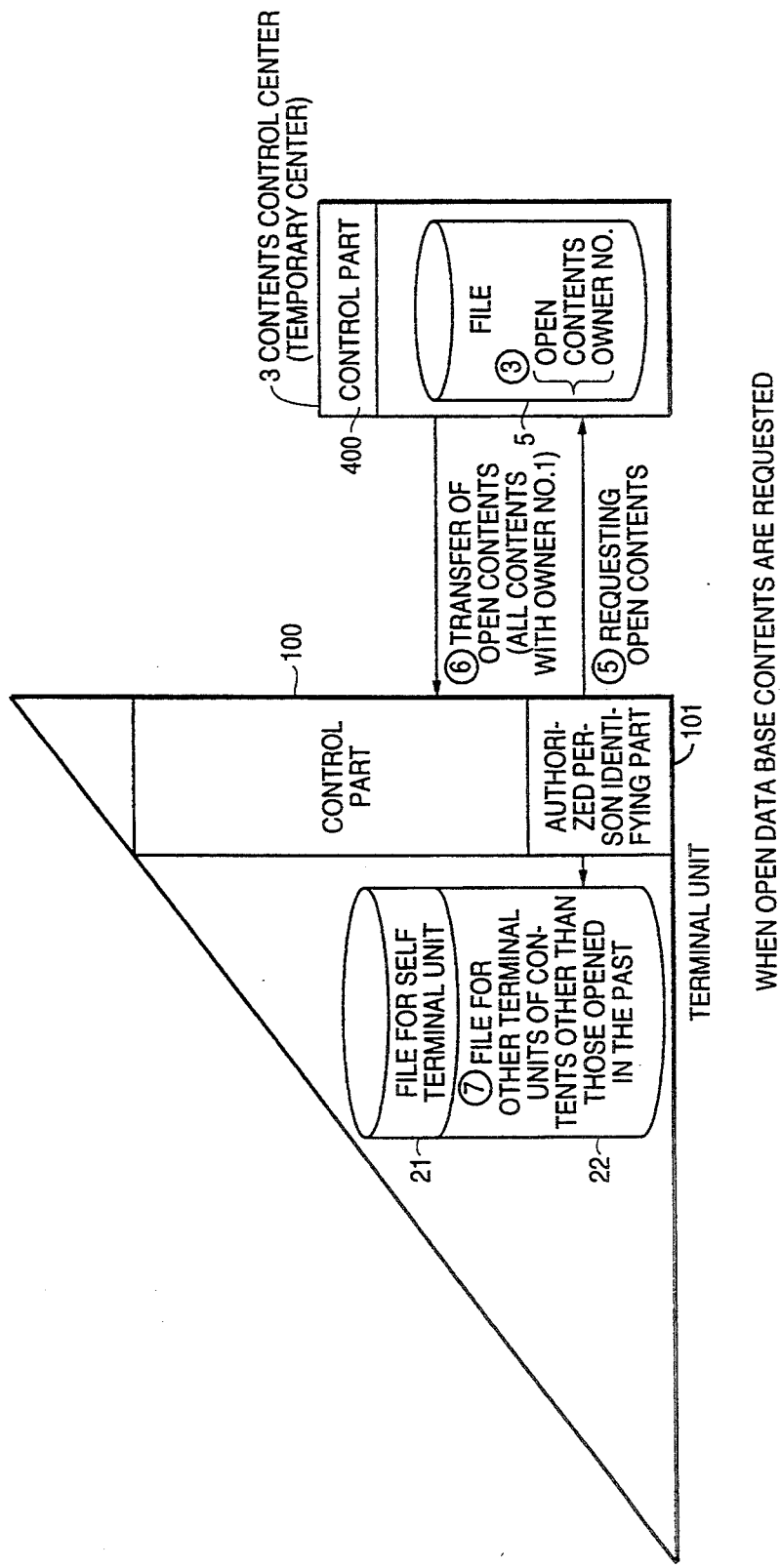

PRINCIPLE OF COMMAND CONTROL CENTER

PRINCIPLE OF COMMON COMMAND SYSTEM

FIG. 11A (A) CONTROL INFORMATION TABLE

○ ○ ○ ○    xxxxxx    xxxxxxxx
NAME      ID - NO.      RANK xxxx      xxxx
PASSWORD    KEYWORD

~55

(B) READING CONDITION TABLE

| | ITEM | RANK |
|---|---|---|
| OPEN DATA A | ITEM | RANK |
| OPEN DATA B | ITEM | RANK |

~56

(B) CONTENTS LIST TABLE

| | ITEM | TERMINAL NO. | | STORING POSITION |
|---|---|---|---|---|
| OPEN DATA A | ITEM | TERMINAL NO. | | STORING POSITION |
| OPEN DATA B | ITEM | TERMINAL NO. | | STORING POSITION |

~57

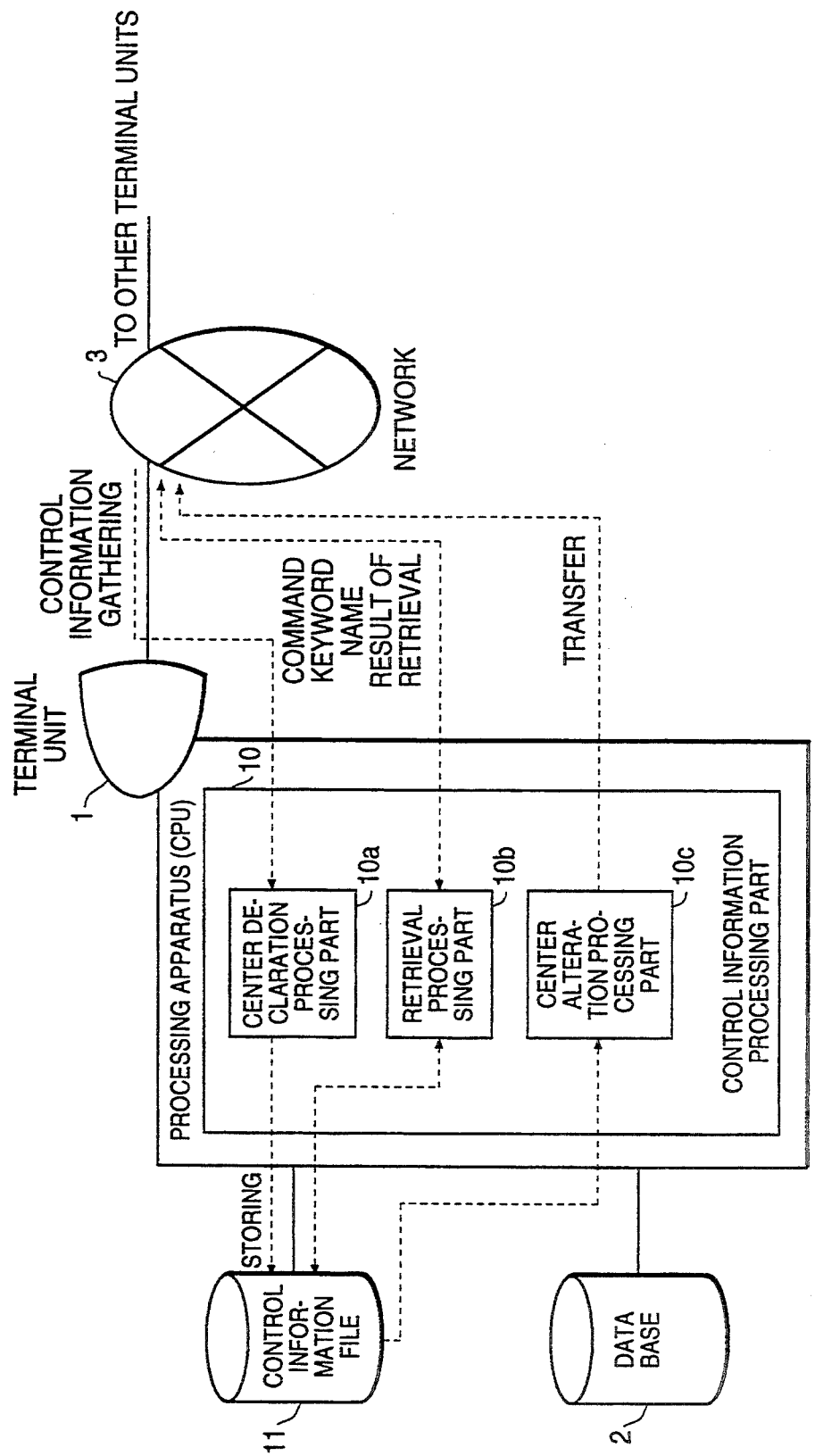

DISTRIBUTED DATA BASE SYSTEM

COMMAND TRANSFER SYSTEM

DISTRIBUTED DATA BASE CONTROL CENTER HAVING A PLURALITY OF INFORMATION TABLES FOR FACILITATING A DIRECT COMMUNICATION AMONG TERMINAL UNITS OF A NETWORK

BACKGROUND OF THE INVENTION

1. Field of the Invention

The present invention relates to a temporary center system in a distributed data base system consisting of a plurality of terminal units connected in the network system.

In these years, a distributed processing system or distributed data base system (hereinafter referred to as distributed data base system) has been structured with a plurality of terminal units connected to the public or private network. In such a system, the data bases provided in each terminal unit are distributed in many areas coupled through a real time network (communication network) and the capability for processing such data bases is also distributed.

The distributed data base system naturally provides a greater part of necessary data within the data base of self terminal units. However, if the necessary data is provided in other terminal units, such data must be received through the network. Therefore, in this case, the distributed data base system is required to improve the disadvantage that a longer period of time is taken for transfer of data.

2. Background of the Invention

A data base system has been structured in these years with the terminal units, which are connected in the network, and provide a plurality of information processing functions. From the view point of control, the conventional data base systems may be classified into the centralized type system and distributed type data base system. The centralized data base system controls all data bases with the one center host and retrieves necessary information by accessing the center host from the other terminal units.

This system has a problem in that the center host becomes large in scale and the load of the center host becomes excessive because accesses from the other terminal units to the center host are centralized. As a system to solve such a problem, a distributed type data base system has been used. In the case of this data base system, a plurality of terminal units connected in the network system is respectively provided with data base to be controlled by each terminal unit.

A conventional distributed data base System will be explained with reference to FIG. 16. In this figure, T1–T4 denote terminal units, T1–T4 respectively providing information processing means (CPU, memory, input/output unit, file unit, etc.). F denotes a file for storing data bases stored in each terminal unit. NW denotes a network (public network or private network).

FIG. 16A indicates the basic structure of a distributed data base system. A plurality of terminal units T1–T4 provides a greater part of necessary data within the data base thereof. However, in case the data base is provided in other terminal unit (in case it is detected the related data is provided in the other terminal unit), the terminal unit requests the data by sequentially making inquiries to the other terminal units through the network. For instance, when the terminal unit T1 requests data from terminal unit T2, the data is extracted from a file unit in the terminal unit T2 when such data exists therein, such data is then transferred to the terminal unit T1 through the network.

In the conventional distributed type data base system shown in FIG. 16A, in case each terminal unit does not have the data of the other terminal units in the data base of the self terminal unit, when each terminal unit cannot find the necessary data by retrieving the data base of the self terminal unit, each terminal unit sequentially issues an inquiry to the other terminal units whether there is the necessary data or not through the network system. When a certain other terminal unit has such data, each terminal unit receives the necessary data from such other terminal unit through the network. Thereby, there is a problem in that the load applied on the terminal units and network becomes excessive.

Moreover, in case each terminal unit always holds all data in the system, this system has a problem in that when data is generated, such data must be transferred to each terminal unit and thereby a load on the network becomes excessive like the preceding case.

In addition, when the data transmitted to each terminal is revised, the revised data (revised reference) must be transmitted to each terminal (this is called the missing operation).

The distributed type data base system has a problem, as explained above, in that each terminal unit operates taking a longer period to retrieve and gather necessary data, the application period of network increases and the load of terminal units and the load of network become remarkable in comparison with the number of terminal units.

On the other hand, in place of the direct transfer of data, a command transfer system has been proposed. In this case, data is expressed by compressed command (code) and a quantity of information at the time of transfer is decreased. The structure of this system is shown in FIG. 16B.

The command transfer system will be explained. For example, in the terminal unit T2, "VOL1" is assigned as the compressed command to certain data. Here, it is assumed that the terminal unit T1 issues the data transfer request to the terminal unit T2.

In this case, the terminal unit T2 does not transfer the data but transfers the assigned command "VOL1" and the number information "T2" as the additional information, which indicates the terminal unit has such data. Upon reception of the command, the terminal unit T1 retrieves data corresponding to the command and stores the retrieved data in the self (T1) data base.

In this case, if there is no data corresponding to the command in the self data base, the terminal unit T1 makes access to the terminal unit T2 using the number information "T2" of the terminal unit added to the command and requests the data corresponding to the command "VOL1". Thereby, the terminal unit T1 acquires the object data.

In the same way, when the command "VOL2" and "T3", which indicates the position of data, are transmitted from the terminal unit T3 responding to the data request from the terminal unit T1, such data may be obtained in the same sequence as that explained above.

In some cases, a data group consisting of a plurality of data or a plurality of integrated data is processed in relation with each other in the data base. However, the data base utilizing the commands shown in FIG. 16B has a problem in that the load on the network and terminal units is increased and a longer time is also taken because inquiry is sequentially made to each terminal unit in order to confirm whether there is related data or not. Then, the data is gathered and the editing process is carried out.

In addition, when a request to read the data in the data base or a request to obtain the data is issued in the data base system, the qualification for reading the data is checked, except for the data to be opened to any terminal unit (or person). In the conventional system, it is checked whether a user has the reasonable qualification or not for the data read request (data request) issued from the user (or the terminal unit) at each terminal unit. This check is usually conducted using a personal ID (ID number), pass word, or keyword. Namely, the personal ID precedingly registered as the qualification is collated with the personal ID input by user. When these IDs coincide, data reading is allowed. However, according to this conventional reading system, even if a person does not have reasonable qualification, he can read the data base any time he wants only by inputting the reasonable personal ID.

Therefore, there is a problem in that any information may be read with any personal ID without relation to importance of data. This problem is particularly important in the distributed type data base connected to the public network. Namely, it is desirable that the data other than that which should be kept as secret (closed data) should be read (opened) from any terminal units. Thereby, it becomes possible to read the data with each other between the physically separated terminal units and to realize the processing using such data. Therefore, this system can fully characterize the connection with the public network and the features of the distributed data base system.

But, on the other hand, this system cannot satisfy the request that the data should naturally be read (should be set as the open data) between different terminal units only by the person having the qualification such as the personal ID. Namely, the conventional system has a problem in that the data base has been closed because it is impossible to give a limitation on the qualification in accordance with the importance of data.

SUMMARY OF THE INVENTION

It is therefore the principal object of the present invention to provide a temporary center system in the distributed data base system which has eliminated necessity of transmitting all data to the terminal units holding each data base through the network and alleviates network load by efficiently obtaining the latest data.

It is another object of the present invention to realize in the distributed data base that the center having the control information is capable of controlling the data revised and providing adequate revision information to users.

It is still another object of the present invention to realize that the terminal unit connected to the center of distributed data system is capable of separately processing the data opened by the self terminal unit and the data opened by the other terminal units.

It is a further object of the present invention to provide a temporary center of distributed data base system which obtains the data corresponding to the necessary commands, in the case of transferring commands in the distributed data base system, without making inquiry to each terminal unit whether such data is stored in the data base of terminal unit and efficiently obtains the data having a certain command and the data related thereto with the same command.

It is still further object of the present invention to provide a control processing system in the distributed data base system which processes the incorporated data located in the distributed areas as the single data on the occasion of transferring commands in the distributed data base system.

It is another object of the present invention to provide a temporary center system of distributed data base system, which is capable of establishing limitations on data reading in accordance with the importance of data opened and qualification of the person in the center for controlling the security of the distributed data base system.

It is an additional object of the present invention to utilize the data base by grouping the terminal units connected to the network of distributed data base system and to provide a temporary center system in the distributed data base system for utilizing data between groups.

It is still a further object of the present invention to provide a temporary center system in the distributed data base system which realizes distribution of loads of center function for holding and processing the control information of the distributed data base system and prevention of risk during failure.

The present invention structures a distributed data base system with a plurality of terminal units connected to a network, assigns one of the terminal units as a content control center for controlling all contents of opened data, stores contents of data in a self file of the data offering terminal unit for opening the data and sends the contents and terminal identification number to the content control center.

The content control center registers the contents sent from each data offering terminal unit and sends the registered contents to the terminal unit of the user when the request for contents is issued therefrom. The user terminal unit refers such contents, detects the necessary content and obtains necessary data from the data offering terminal unit by making access thereto.

The contents control center controls a number of revisions when the revised contents of the open data base is registered from the data offering terminal unit and adequately sends the number of revisions for the request to open the contents issued from the user terminal unit. Moreover, the terminal unit which issues a request for contents to the contents control center checks contents of data opened by own terminal unit from all the opened contents sent from the contents control center, so that it is not input and fetches only the contents opened by the other terminal units.

The present invention assigns the one of the terminal units of the distributed data base system for command transfer as a command control center for controlling the commands, registers the terminal unit identification information holding the data corresponding to the command to the command control center and offers registration information to the terminal unit responding to the request. In addition, the present invention assigns a common command to an incorporated data group held by the data base of one or a plurality of terminal units to control the command in the command control center and makes easier the access to the data group corresponding to the common command to the terminal units.

The present invention is further provided with a command control center for centrally controlling a plurality of commands in case the command transfer is carried out in the distributed data base system, and is also simultaneously capable of processing the data corresponding to the equalized commands in the data processing corresponding to the one command in the terminal unit.

The present invention registers the first rank to the item such as content of data corresponding to importance of data opened in the content control or command control center. The present invention also registers the identification information of a terminal unit (individual) which is allowed to read the data and the information including the second rank to such terminal unit (individual). The present invention carries out data security control by limiting to the terminal unit (person) which is allowed to read data by checking the terminal unit and checking whether the rank satisfies the conditions or not when a request is issued from the terminal unit.

The present invention forms a group with a plurality of terminal units connected to the network forming a distributed data base system. Further, the present invention mutually utilizes data by providing the control center in the group and utilizes the data between different groups through the inter-group control center.

The present invention is also capable of assigning the center having various functions explained above as the control center to be provided in the distributed data base system. The present invention realizes distribution of functions. In addition, the present invention takes measures for the center when a failure occurs therein by sending a message to the other terminal units that the data base control can be realized in any terminal unit among those connected in the network and operating such terminal unit as the center by gathering necessary control information from the other terminal units.

BRIEF DESCRIPTION OF THE DRAWINGS

FIGS. 3A, 3B and 3C are processing flow of revision number control and is an example of the structure of a file.

FIGS. 4a and 4B show mutual operations of a terminal unit and center for identification of a person allowed to read the data.

FIG. 11A is a diagram for explaining a table.

FIG. 15A is a structure of an embodiment.

DESCRIPTION OF THE PREFERRED EMBODIMENTS

The preferred embodiments of the present invention for attaining the objects explained above will be explained sequentially hereunder.

Figure 1:
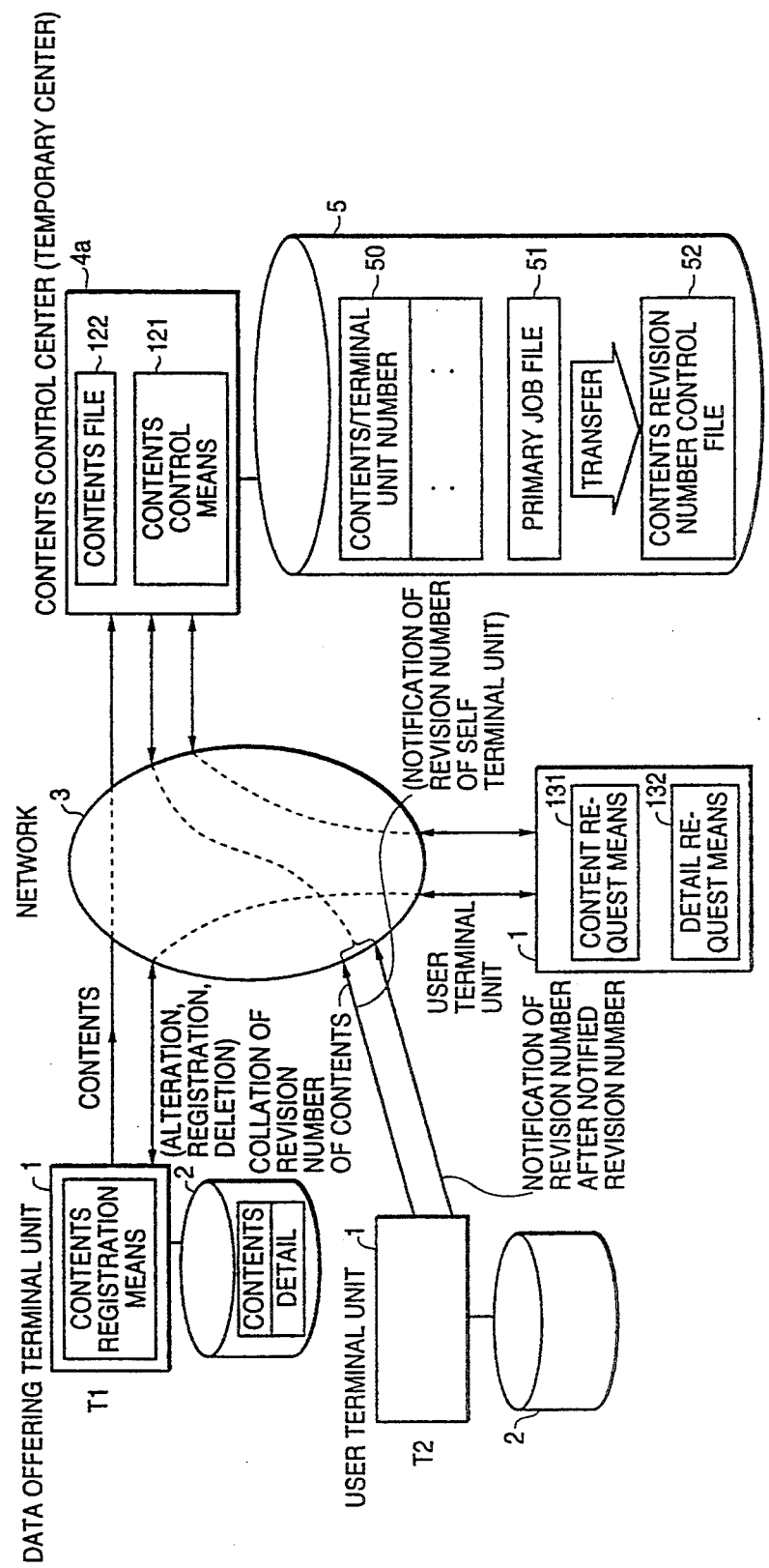
FIG. 1 is a basic structure of an embodiment of the present invention.

FIG. 1 is a basic structure of the embodiment 1 of the present invention.

In FIG. 1, the reference numeral 1 denotes a terminal which provides an information processing function and a file 2 for storing distributed data base. The terminal 1 is classified into the codes T1-T3 and T1 indicates here a data offering terminal unit, while T2-T3 indicate user terminal units respectively in accordance with the operations of each terminal unit. The reference numeral 2 denotes a file for storing data base of each terminal unit. The reference numeral 3 denotes a network such as the public network or private network. The reference numeral $4a$ denotes contents control center (temporary center) for controlling contents (or titles) of each data of data base in each terminal unit forming a distributed data base. The reference numeral 5 denotes a file for the center including a contents file storing all contents (contents of open data) by pairing each content and terminal identification information (terminal number) for holding such data.

The contents control center $4a$ is used as the one of the temporary centers in the present invention. Here, the term "temporary center" used in this application has the following meaning.

In the present invention, the one or a plurality of terminal units of many terminal units forming a distributed data base system are given the control information (contents in an example of FIG. 1) concerning the distributed data base system. Thereby, such terminal unit is assigned as a center which searches the control information by referring to the control information for the inquiries (collations) from the other terminal units and executing the processing as the response to the result of searches. The terminal unit called the "temporary center" having such center function is not fixed only to a particular terminal unit. The temporary center is changed in accordance with necessity, and allows setting in plural numbers in accordance with the kind of control information.

In the structure of FIG. 1, the contents control center $4a$ is provided in the terminal units forming the distributed data base system, a data offering terminal unit stores therein the main contents as the actual contents of data only by registering the contents (or "titles") of data (references) and a user terminal unit extracts contents from the contents control center and extracts also the main contents of necessary data by issuing request to the data offering terminal unit. Moreover, the contents control center 4a is provided with a contents versions control file 52 for controlling a number of versions of contents in the contents control processing.

The basic operations in the structure of FIG. 1 will be explained. When data is generated in the data offering terminal unit T1, it calls the contents control center 4a through the network 3 and transmits and registers the contents (including the information indicating the offering source) of data to the contents control center 4a through the network 3 by means of a contents registering means. Thereby, the data of main contents of data (reference) is stored and controlled in the file 2 of the data offering terminal unit T1. Upon reception of the contents data, the contents control center 4a stores such data in the contents file 122 by the operations of contents control means 121. The contents file 50 stores the contents transmitted from a plurality of data offering terminal units T1.

When a data base user accesses the contents control center from the user terminal unit T3 through the network 3 and requests data from the contents request means 131, the contents control means of the contents control center 4a extracts all contents of the contents file 50 and transmits it to the user terminal unit T3. The user terminal unit T3 detects the contents list on the display unit (not illustrated) and selects the one content among them. In this case, access is made to the data offering terminal unit T1 from the detail request means 132 through the network 3 using the information indicating the offering source included in the "content" in order to request the detail of the selected "content".

The data offering terminal unit T1 extracts the data of detail corresponding to the "content" requested from the user terminal unit T3 by retrieving the file 113 and transmits such data to the user terminal unit T3.

Figure 2A:
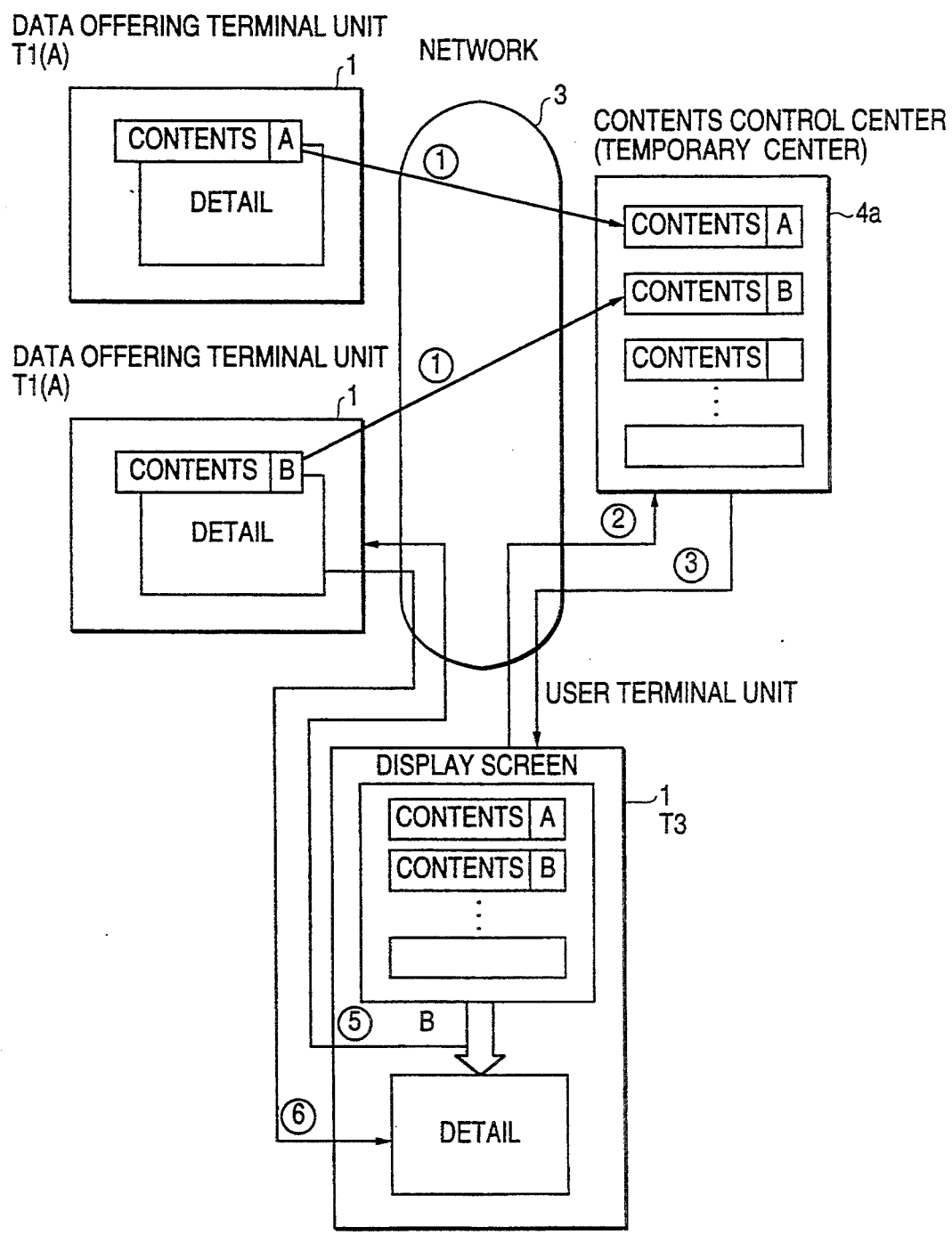
FIG. 2A is a structure of an embodiment using the content control center.
Figure 2B:
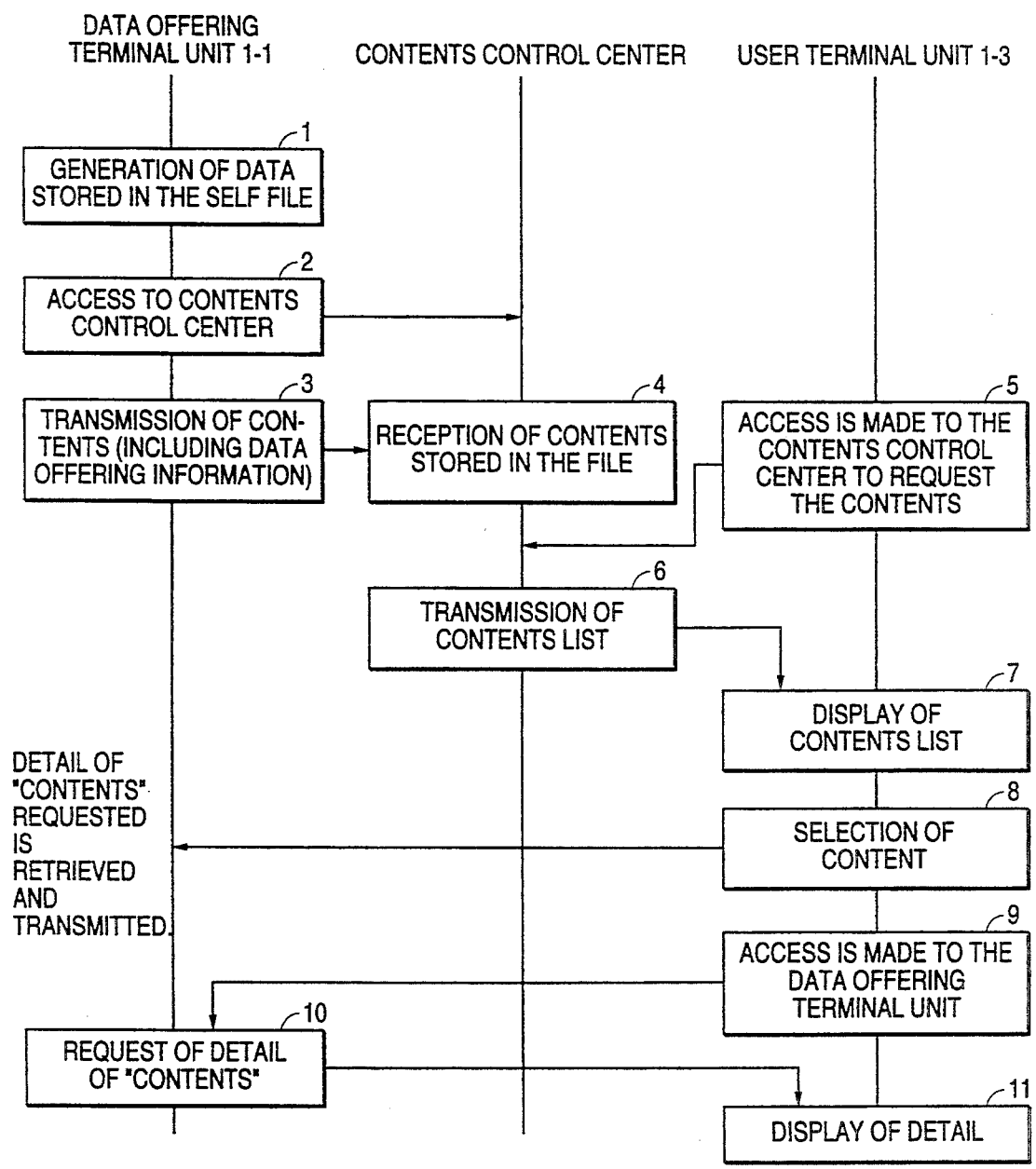
FIG. 2B is an example of the operation sequence of the content control center.

An embodiment of such distributed data base system utilizing the contents control center is shown in FIG. 2A and an example of the operation sequence thereof is shown in FIG. 2B.

In the structure of FIG. 2A, two kinds of data offering terminal units T1-A and T1-B are indicated but the other structure is the same as that of FIG. 1.

Operations of the embodiment of FIG. 2A will be explained hereunder in the sequence of ①  to ⑥  in FIG. 2A with reference to an example of operation sequence of FIG. 2B.

① When data (reference) is generated (or input) in the data offering terminal unit T1 (any one of A or B), such data (contents and detail) is stored in the file of data base in the self terminal unit (1 in FIG. 2B).

In this case, when it is requested to use such data in the other terminal unit as the data base, access is made to the contents control center 4a through the network 3 (2 in FIG. 2B). When the contents control center 4a is connected, the data offering terminal unit T1 transmits (3 in FIG. 3B) the contents (or short string of characters or numerals such as titles) of data to be registered as the data base together with the information indicating the data offering terminal unit (A or B in the example of FIG. 2A). Upon reception of such contents, the contents control center 4a stores and controls the contents including the data offering terminal unit information in the file (4 in FIG. 2B).

② In case the user terminal unit T3 uses the data base, this terminal unit accesses the contents control center 4a and issues a request for contents when connection is set through the network (5 in FIG. 2B).

③ When this request is received, the contents control center 4a extracts a list of contents from the control file and transmits such list to the user terminal unit T3 (6 in FIG. 2B).

④ Upon reception of such list of contents, the user terminal unit T3 display the list on the display screen of display unit as shown in FIG. 2A (7 in FIG. 2B).

⑤ A user of the user terminal unit T3 selects the one content (through an input means such as keyboard or mouth, etc.) from the list of contents displayed on the screen. The data offering terminal unit information (for example, A) included in the contents is transmitted as the control signal for selecting a partner to the network 3 (8 in FIG. 2B). Thereby, the user terminal unit T3 accesses the data offering terminal unit T1-A registering such "content" through the operations of network 3 (9 in FIG. 2B). After connection is extended, when the "detail" of the "content" information selected is requested (10 in FIG. 2B) to the data offering terminal unit, the data offering terminal unit retrieves the data of "detail" of such "content" from the file being controlled (10 in FIG. 2B).

⑥ When the corresponding "detail" is detected in the data offering terminal unit T1, such data is transmitted to the user terminal unit T3 issued the request (10 in FIG. 2B). The user terminal unit 24 can detect contents of "detail" by displaying or printing on the output unit.

In case the data offering terminal unit requests revision of data registered in the structure of FIG. 2A, it may be realized only by sending and registering the contents including revision to the contents control center 4a. Therefore, it is no longer necessary to transmit the revised data when it is generated.

According to this system, the load on the network, data offering terminal units and data registering terminal units may be alleviated in comparison with the conventional system because it is unnecessary to register entire part of data. Moreover, a terminal user is also capable of selecting data referring to the contents. Therefore, it is no longer necessary to receive unnecessary data (detail) and thereby access time may be curtailed. In addition, the load of the contents control center may also be eased because it is required only to control the contents.

The operation principle for controlling revisions of contents will be explained hereunder with reference to FIG. 1.

In FIG. 1, when a user sends the revised contents of open data base to the contents control center 4a from the data offering terminal unit T1, the contents control center 4a stores temporarily and sequentially the revised contents in a job file 51 and transfers such contents to the contents revision control file 52 with addition of a number of revisions to the contents for each preset time or each time when the number of contents reaches the preset number. When the user terminal unit T2 issues a collation request for number of revisions of contents to the contents control center 4a together with the latest number of revision message of such terminal unit, insufficient number of revisions after such latest number of revisions is extracted from the contents control file 52 and is then transferred to the terminal unit from which the collation request is issued.

The processing flow in the embodiment of the revision controls based on the principle explained above will be explained with reference to FIGS. 3A to FIG. 3B.

The processing flow in revision (including registration, alteration and deletion) of contents shown in FIG. 3A will be explained first. S1, S2 . . . means the step 1, step 2 . . . .

Upon reception of the contents revision request from the terminal units A and B (S1, S2 in FIG. 3A), the contents control center 4a stores (S3) the revised contents of terminal unit A and revised contents of terminal unit B in the primary job file 51. The storing condition to the primary job file 51 is shown in the upper side of FIG. 3B. Here, S means the step.

Thereafter, all contents stored in the primary job file 51 are transferred to the contents revision number control file 52 (S5) under the updata condition (S4) when a constant time (for example, 24 hours) has passed or the number of contents has exceeded the predetermined numbers (for example, 100 items) or the time has reached a constant time (for example, 0 hour 00 minutes).

Figure 3B:
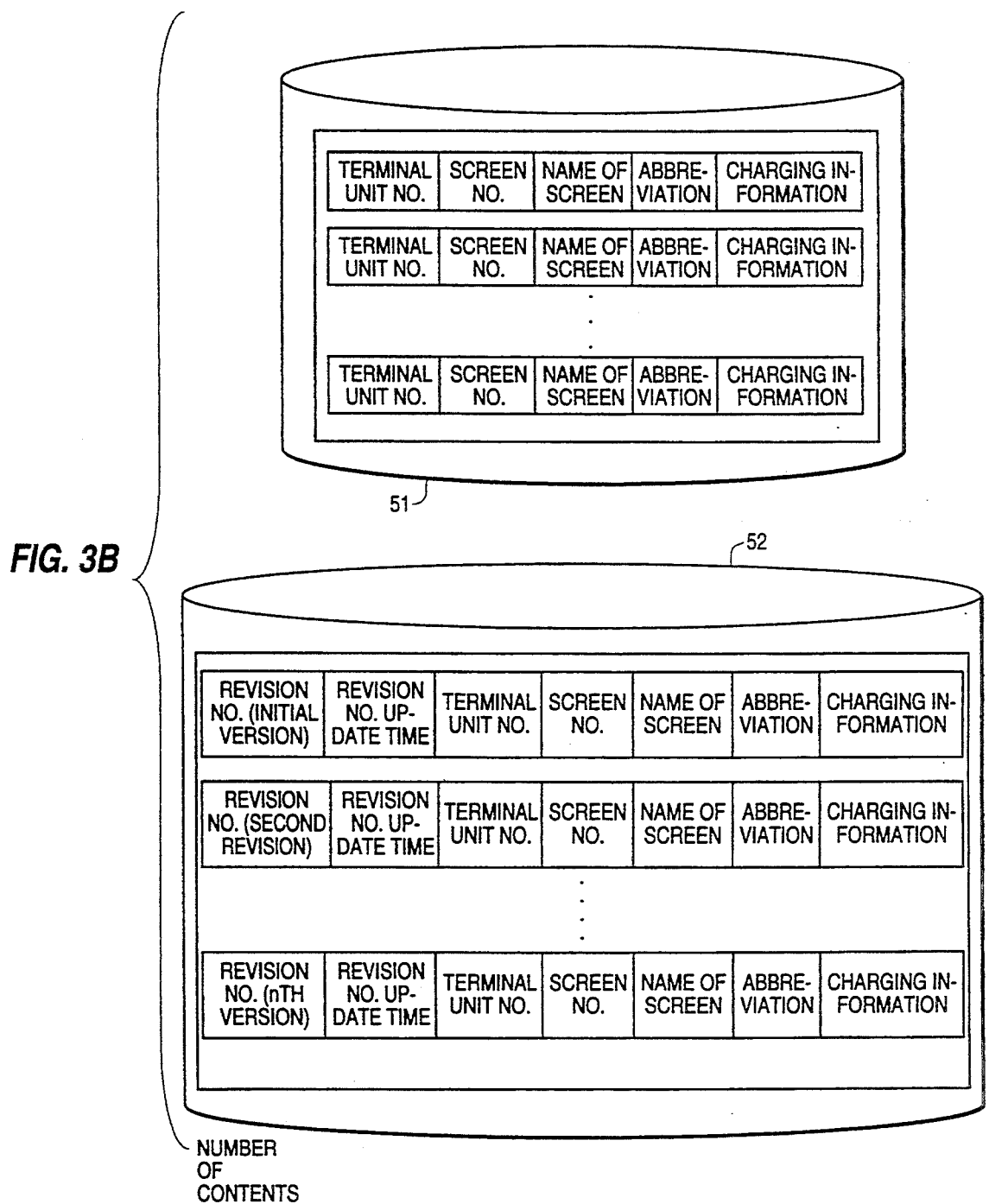

The storing condition in the contents revision number control file 52 is indicated in the lower part of FIG. 3B. In this example, the revision number update time is also registered together with the revision number. It is a matter of course that the same revision number is added to the contents which has been once transferred together to the contents revision number control file 52 from the primary job file 51.

On the other hand, when the revision number update condition in the step S4 is not yet established, the contents control center 4a executes the processings other than the content revision number control.

Figure 3C:
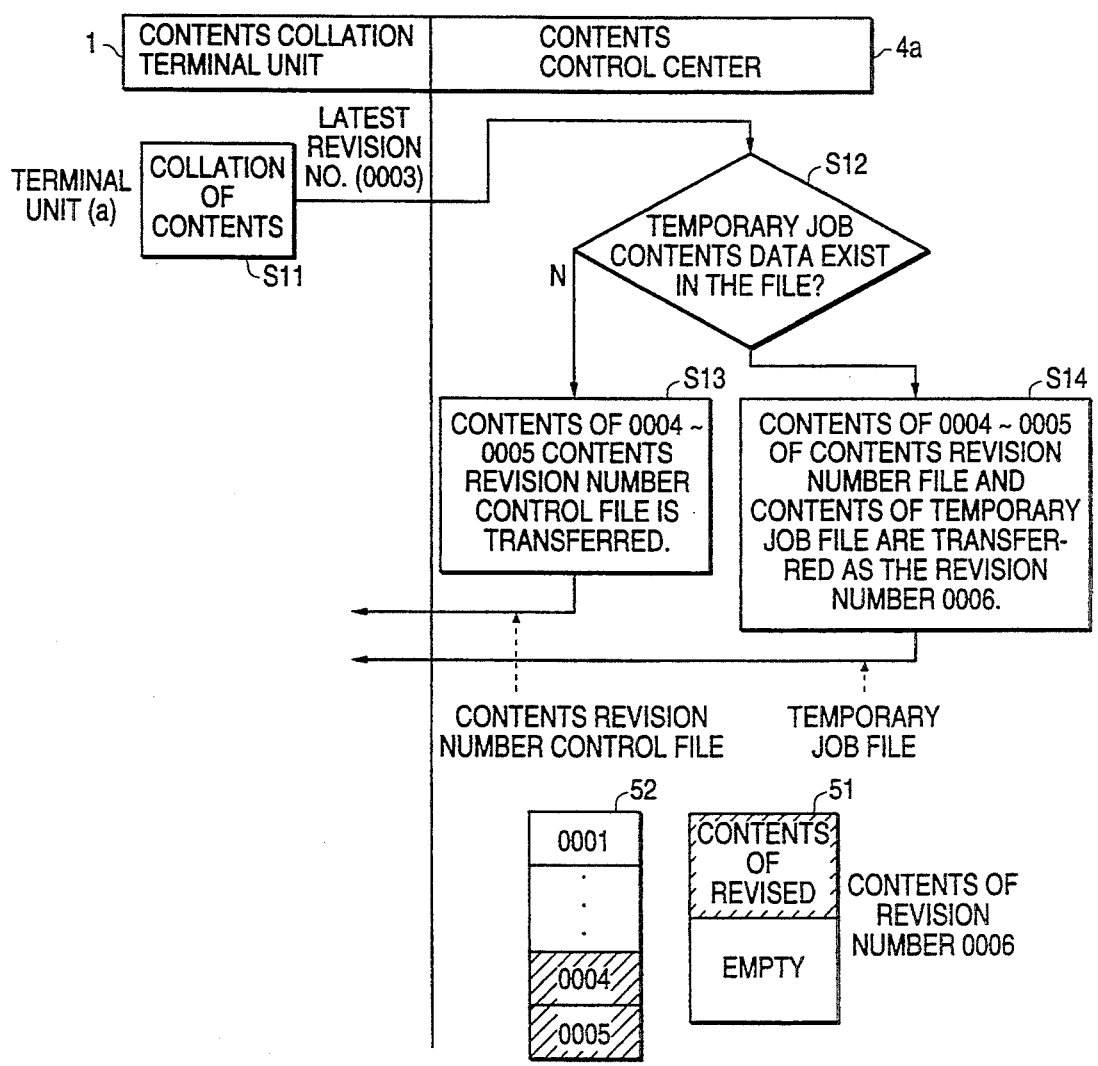

Next, the contents collation example shown in FIG. 3C will be explained.

For example, when collation of contents is requested from the terminal unit A (S11), the latest revision number 0003 in the terminal unit A is sent to the contents control center 4a. The contents control center 4a decides first whether the contents data exists or not in the primary job file 51 (S12). As a result, when it is decided that the contents are not stored, the detail contents of revision numbers 0004 and 0005 (this revision number 0005 is assumed as the latest number) after the revision number 0003 of the content revision number control file 52 of the contents control center 4a are transferred to the terminal unit A (S13).

Moreover, when it is decided that the contents data exist in the primary job file 51, the revision numbers 0004 and 0005 of the contents revision number control file 52 are transferred to the terminal unit A and all contents in the primary job file 51 are transferred to the terminal unit A as the revision number 0006 (SI4). Here, not only the latest revision number 0005 stored in the contents revision number control file 52 but also the preceding revision number 0004 are transferred for the revision number 0003 collated from the terminal unit because if the revision number is changed, it becomes uncertain that the screen requested from the terminal units is in the old revision number or in the new revision number.

With such revision number control, the user terminal unit, which has issued a request of opened contents, is capable of obtaining the contents other than that in the self terminal unit. Thereby, the transfer period may be curtailed. Moreover, the processing capability of the contents control center can be improved as much as curtailment of processing period.

FIG. 4 shows relationship between the terminal unit having the authorized person identification function and the center in the present invention.

This terminal unit is provided with a means for processing individually the data opened by the self terminal unit and the data opened by the other terminal units when the contents control center of the distributed data base system is accessed.

In FIG. 4, the reference numeral 1 denotes a terminal unit. The reference numerals 20 and 21 denote contents files provided in the terminal unit 1. The reference numeral 20 denotes self terminal unit file storing contents of data to be held in the self terminal unit. The reference numeral 21 denotes other terminal unit file storing contents of data to be held in the other terminal unit. The reference numeral 4a denotes contents control center. The reference numeral 5 denotes file held by the contents control center. This invention is characterized in providing the authorized person identification part 101 in the terminal unit 1.

First, outline of opening the contents of data base shown in FIG. 4(a) will be explained. When an owner (user) of the terminal unit 1 wants to open the self data base, following processings ①-④ are executed sequentially.

① The contents of data base to be opened are extracted from the self terminal unit file 21 and are then transferred to a control part 100.

② The contents and owner number are transferred to the contents control center 4a in order to request opening of the contents.

③ The contents control center 4a stores the contents and owner number sent from the control part 400 in a frame 5.

④ The control part 400 in the contents control center 4a sends a message to the terminal unit 1 in order to notify that the relevant contents opening procedures are completed.

When a user of the other terminal units or a user of the same terminal unit wants to know the contents registered to the contents control center, the processings ⑤-⑦ shown in FIG. 4(b) are executed.

⑤ The terminal unit 1 requests opening of contents to the contents control center 4a.

⑥ The control part 400 in the contents control center 4a transfers the contents and owner number registered in the frame 5 to the terminal unit 1.

⑦ The control part 100 of the terminal unit 1 gives contents and owner number transferred to the authorized person identifying part 101. The authorized person identifying part 101 compares the owner number of the opened contents received with the user number of the relevant terminal unit. When these are coincided, the opened content is reset (because it is offered from the self terminal unit) and when these are not coincided, it is stored in the contents control file 22 for the other terminal units and is also output to the input/output unit as required.

As explained above, the contents of data base opened in the past by users is not double-filed.

Figure 5:
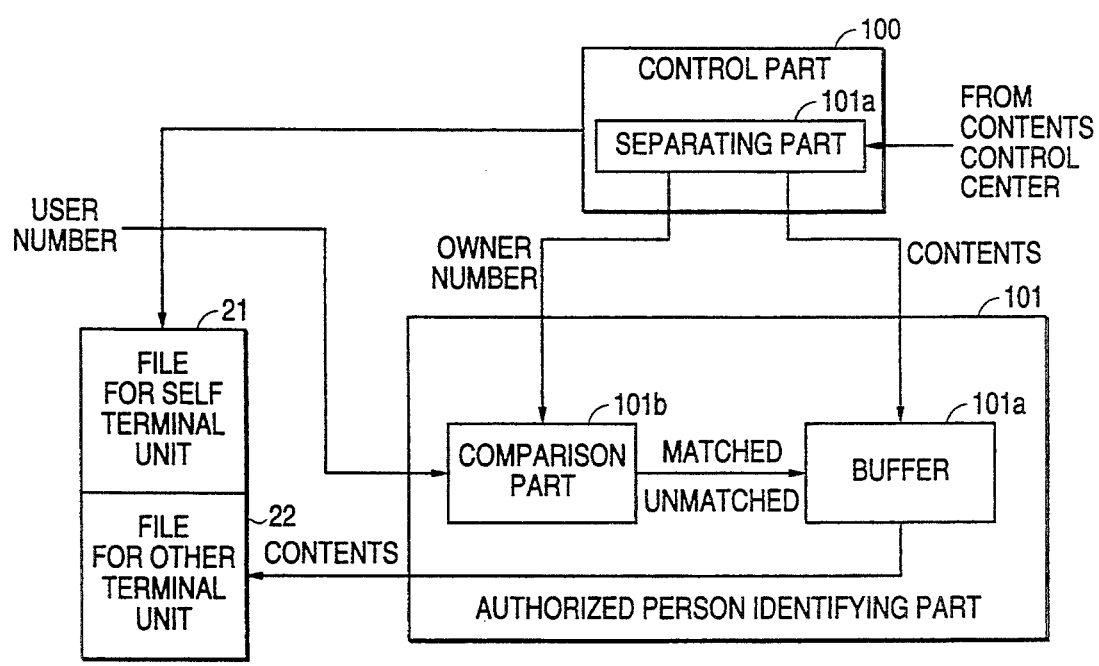
FIG. 5 is a structure of an embodiment of the terminal unit.

Next, an embodiment of the terminal unit shown in FIG. 4 is indicated in FIG. 5.

In FIG. 5, a separating part 101a is provided in the control part 100 and a buffer 101a and a comparison part 101b are provided in the authorized person identifying part 101.

Operations will be explained. The opened contents and owner number sent from the contents control center are separated in the separating part 101a and are sent to the authorized person identifying part 101. The authorized person identifying part 101 stores contents in the buffer 101a. In the comparison part 101b, the owner number sent from the separating part 100a is compared with the user number sent from the input/output unit (not illustrated) for deciding coincidence and not coincidence.

As a result, when these are coincided, the contents stored in the buffer 101a are not output and deleted. When these are not coincided, on the other hand, the contents in the buffer 101a are output and stored in the file for other terminal units 22 under the control of the control part 100a.

Such operations are conducted each time when the opened content is sent from the contents control center 4a and thereby such opened content is stored in the file for other terminal unit 22.

As explained above, it can be avoided that the user who has opened the contents in the past receives the same contents when he requests opened contents (at the time of updating the contents). Thereby, unwanted contents are no longer stored in the file for other terminal unit and the retrieving time can be curtailed.

Next, FIG. 6 shows a basic structure of the embodiment which solves such object of the present invention for realizing effective access to the necessary data and effectively obtaining the incorporated data in the case of executing the command transfer in the distributed data base system.

Figure 6A:
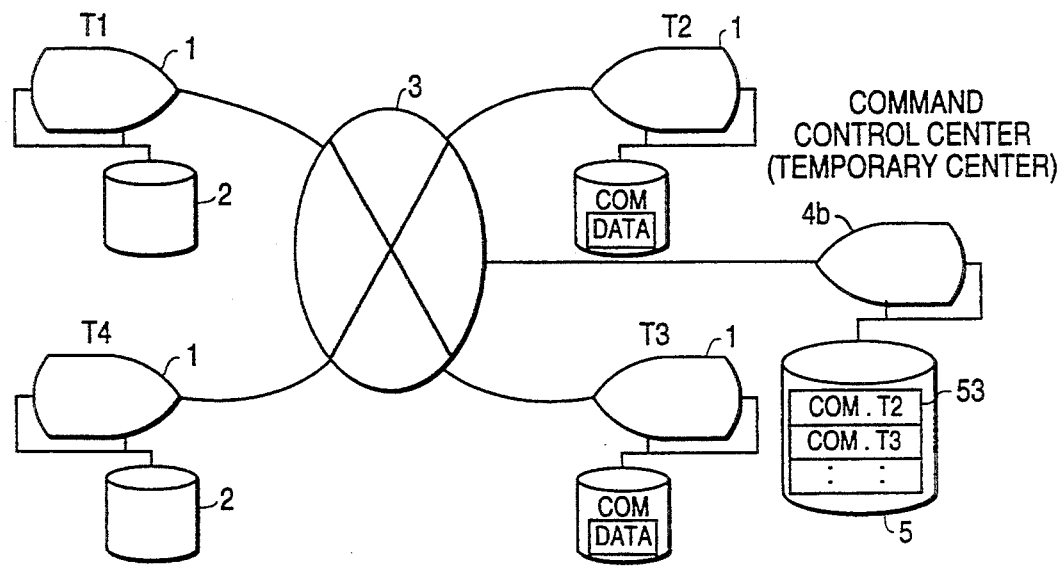
FIGS. 6A and 6B are a basic structure of an embodiment of the system utilizing commands.
Figure 6B:
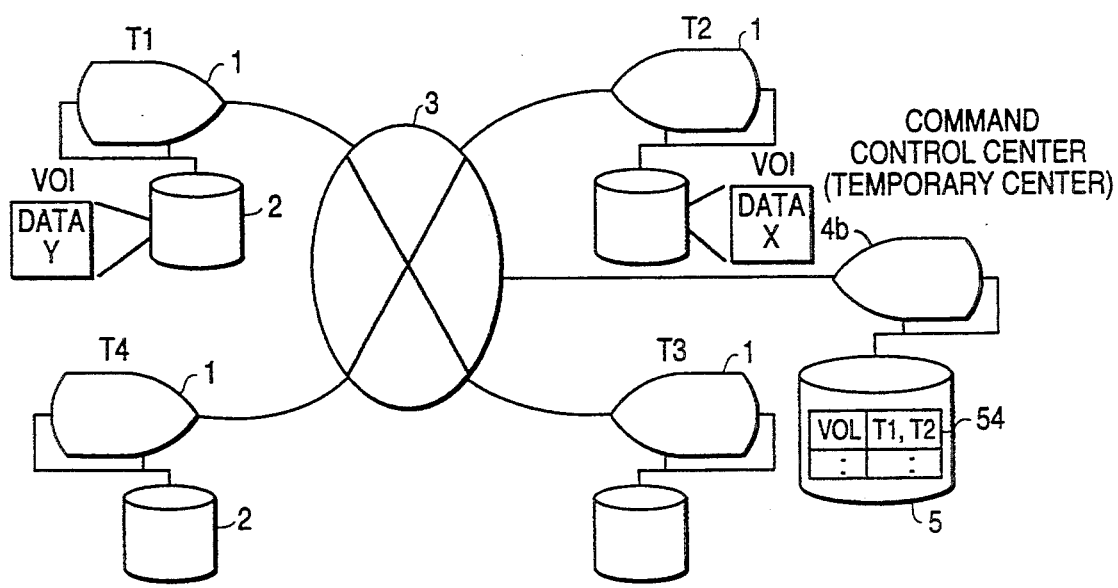

FIG. 6A shows a structure providing a command control center, while FIG. 6B shows the principle of the common command system.

In FIG. 6, the reference numeral 1 denotes terminal units (T1–T3) forming a distributed data base system. The reference numeral 2 denotes a file for storing data base of each terminal unit. The reference numeral 3 denotes a network. The reference numeral 4b denotes a command control center (temporary center).

In this embodiment, a center for controlling commands of data is provided in the distributed processing environment and distributed data base system. Information of terminal unit holding the commands and data corresponding to such commands is controlled. Common commands are set to the incorporated data group and each terminal unit information holding the incorporated data corresponding to common commands to the inquiry from terminal units is obtained from the control center.

In FIG. 6A, the terminal units T1–T4 respectively form the distributed processing environment and distributed data base system. When commands are assigned to respective data of each terminal unit 1, such commands are registered in the command control center 4b. The command control center 4b is provided with a command control table 53 containing commands and corresponding terminal unit identification information (terminal number) as the existing position of data corresponding to such commands. The command control center 4b retrieves the table 53 and responds the identification information of terminal unit for the inquiry from each terminal unit by the commands. In the example of FIG. 6A, the data corresponding to command "COM" is held by the terminal unit T2 and the data corresponding to "CON" is held by the terminal unit T3.

In FIG. 6B, the scattered data incorporated with each other are expressed using the common commands (compressed codes). These commands do not add the identification information (terminal number) indicating the terminal unit holding the data indicated by the command to such command, like the conventional command transfer system, and the commands are controlled in the command control center 4b.

Namely, the command control center 4b is provided with the common commands control table 54 storing the identification information of respective terminal units of a plurality of data forming a data group corresponding to the common commands.

When an inquiry is issued by common commands from the terminal unit 1, the command control center 4b refers to the table 54 and sends the identification information of each terminal unit storing a plurality of incorporated data as the response. The terminal unit 1, which has issued an inquiry, gathers the corresponding data from each terminal using such response information.

The terminal unit holding the data corresponding to commands can be detected by providing the command control center in the system. Moreover, all positions of data may be detected from the command control center, even in case a group of incorporated data is located in the plural position, by using the common command.

Figure 7:
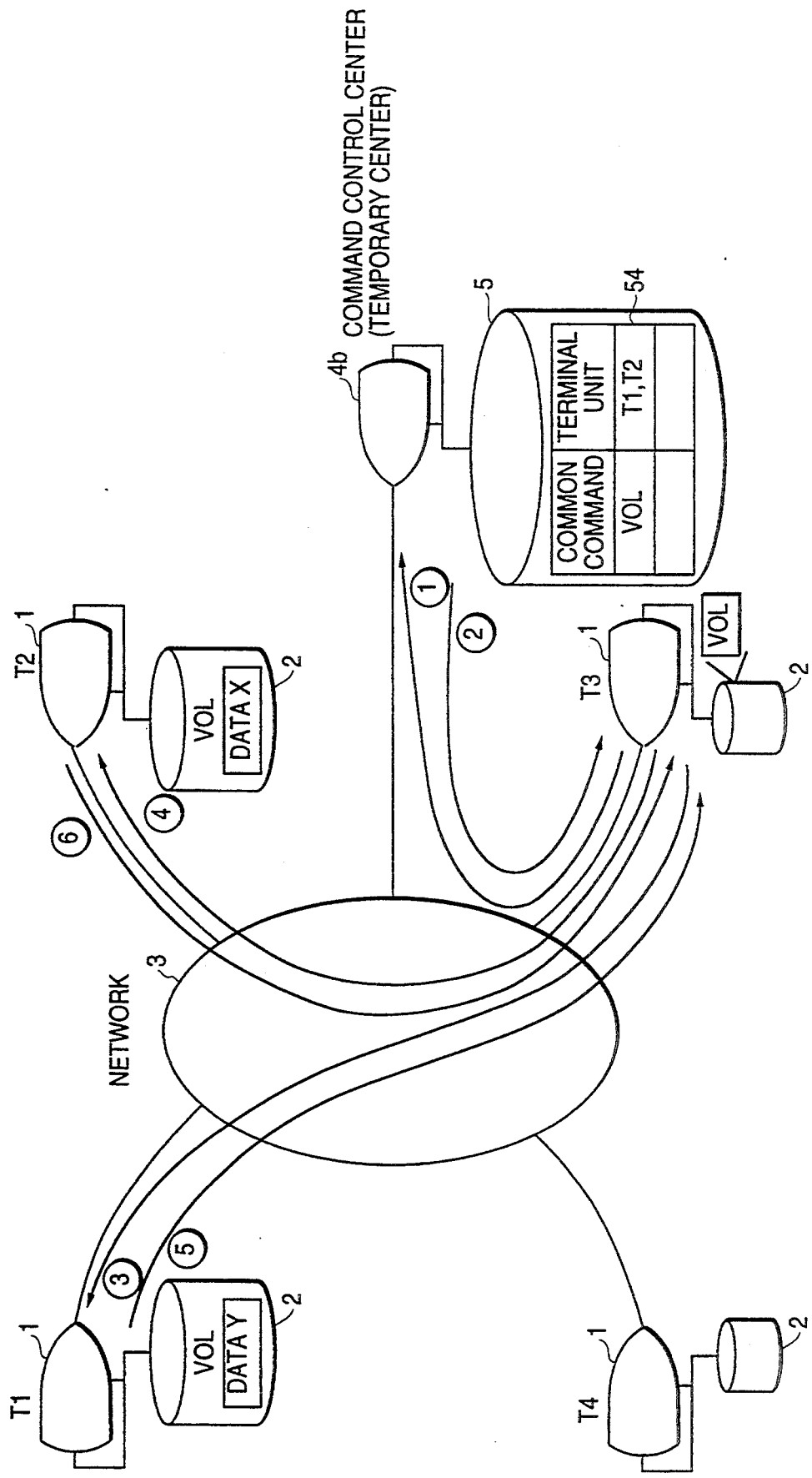
FIG. 7 is a system structure of an embodiment indicating detailed operation.

A system structure of the embodiment indicating details of operations in the structure shown in FIG. 6 is shown in FIG. 7.

Each reference numeral corresponds to the elements designated by the same reference numeral in FIG. 6.

Operations of the embodiment will be explained in the sequence of numbering in the circles.

① In the terminal unit T3, when it is requested to retrieve and gather incorporated data groups, the terminal unit T3 issues an inquiry to the command control center 4b. When the system of FIG. 7 is a private system used in a company, for example, in case the data of a certain customer is scattered in various terminal units, it is sometimes requested to retrieve and gather such data. In this case, an inquiry may be issued to the command control center 4b using the "name of customer" even when the command is unknown.

② When the command control center 4b receives the attribute (for example, name of customer) common to the data group, in place of the command, in the inquiry, it retrieves the common command of the relevant data group and detects "VOL". When it is already known that the common command is "VOL" in the terminal unit T3 when the inquiry is issued, the command control center 4b receives the common command.

The command control center 4b retrieves the common command control table 54 of file unit 5 when the common command "VOL" is obtained and extracts the terminal unit identification information holding the data forming the data group. The extracted terminal unit identification information (terminal units T1, T2 in the example of figure) is transmitted as the response information to the terminal unit T3 which has issued an inquiry.

③, ④ The terminal unit T3 having received such response information requires the data corresponding to the command "VOL1" to the terminal units T1 and T2.

⑤, ⑥ The terminal units T1 and T2 extract data corresponding to the command "VOL" from the file units 211 and 221, responding to such request and transfer such data to the terminal unit T3.

Thereby, since the existing positions of data corresponding to the common command can be obtained at a time from the command control center, it is no longer necessary to send an inquiry to the terminal unit T4 in this example.

Figure 16A:
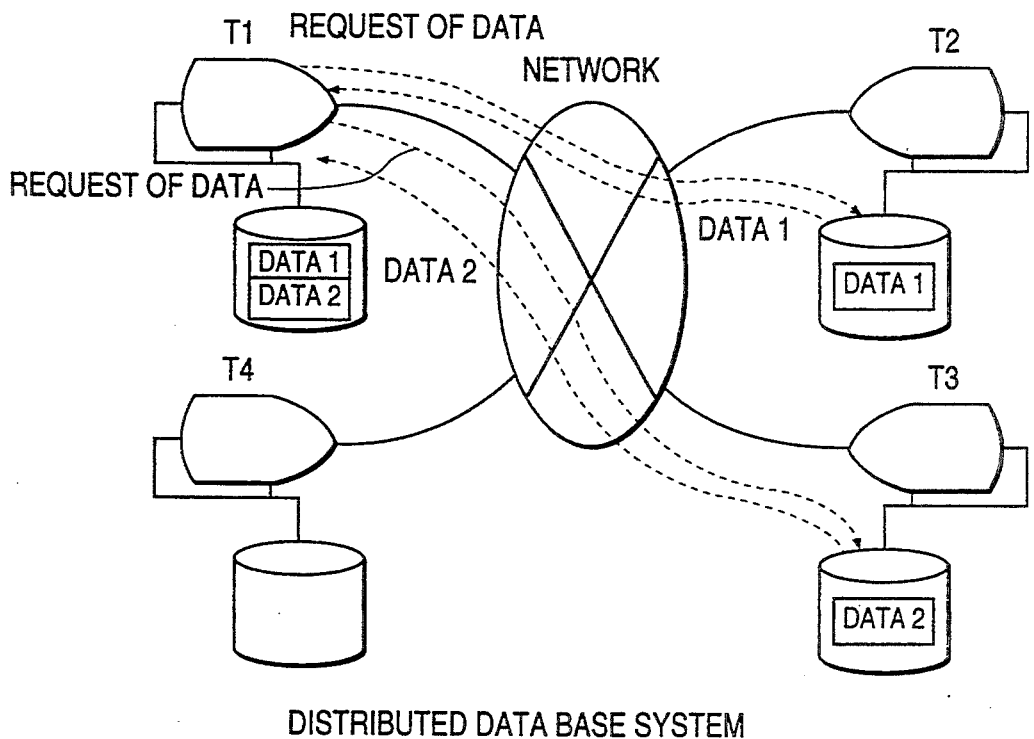
FIGS. 16A and 16B diagrams for explaining the prior art.
Figure 16B:
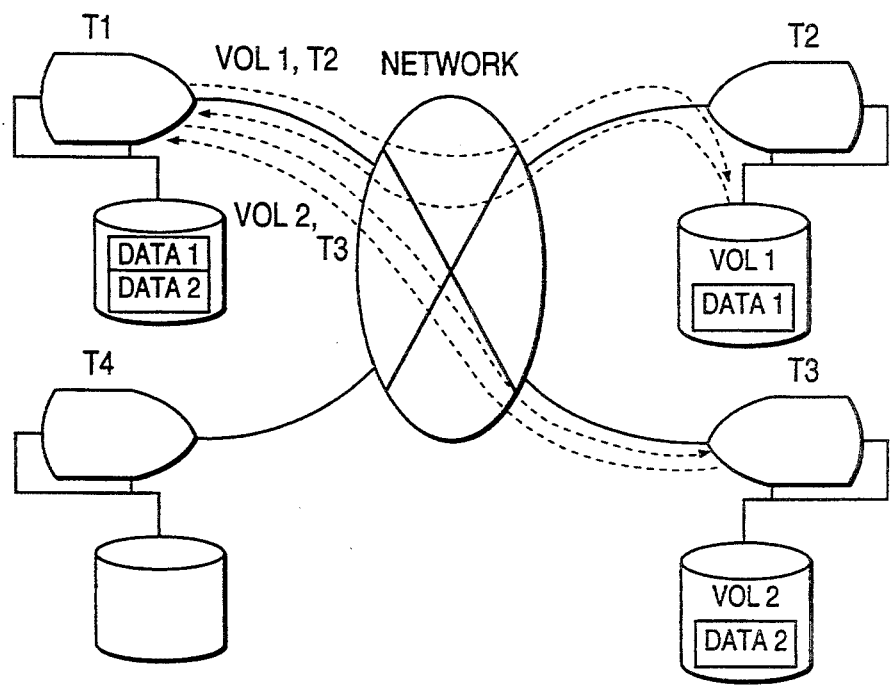

Therefore, the retrieval and data gathering can be realized more effectively than the conventional system (refer to FIG. 16A) in which inquiry is carried out sequentially. Moreover, since incorporated data is expressed by common command, complicated procedures may be avoided in comparison with the system (refer to FIG. 11B) of the prior art for requesting commands corresponding to each data to each terminal unit.

Figure 8:
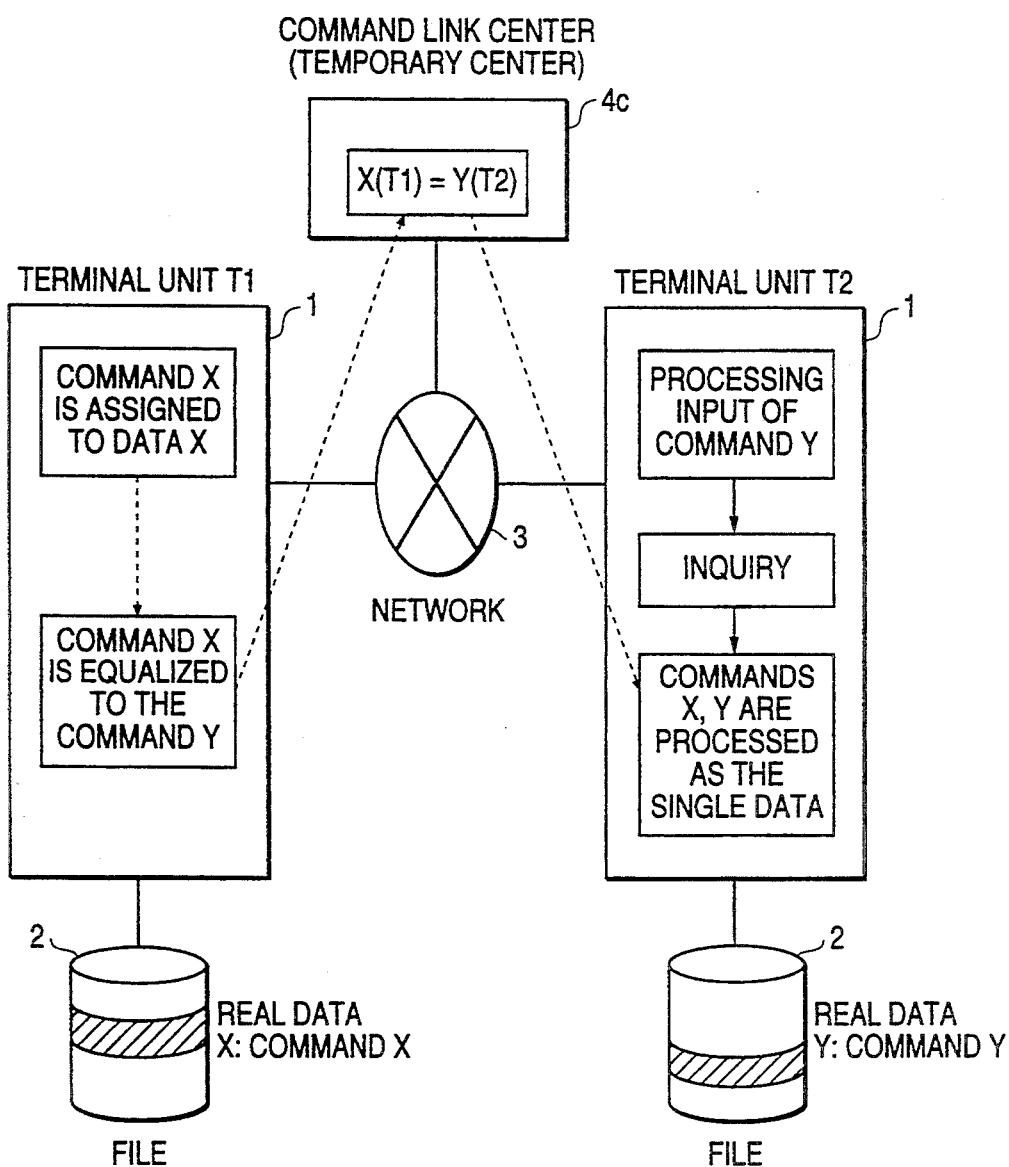
FIG. 8 is a basic structure of an embodiment of the real data control processing using equalized commands.

A basic structure of the real data control processing system for command centralization to realize the object of the present invention for processing incorporated data in the distributed areas as the single data is shown in FIG. 8.

In FIG. 8, the reference numeral 1 denotes terminal unit (T1 and T2). The reference numeral 2 denotes a file for storing real data. The reference numeral 3 denotes a network. The reference numeral 4c denotes a command link center (temporary center).

The terminal unit 1 in FIG. 8 is provided with a means for assigning commands for each real data to express it and for equalizing different commands as required. The real data stored in the file 2 is controlled by the corresponding terminal unit 1 using the command for expressing the real data. The command link center 4c controls at a time the information for the command equalized in the terminal unit 1 (command equalizing information). Therefore, each terminal unit 1 notifies content of command to the command link center 4c for each equalization of commands.

The processing (for example, display processing) input is carried out for the command (assumed as Y) to the terminal unit 1 (T2). Responding to this processing, the terminal unit T2 inquiries existence of command equalized to the command Y to the command link center 4c. Prior to this inquiry, the command (assumed as X) different from the command Y is equalize to the command Y in the other terminal unit 1 (assumed as T1). Thereby, the command link center 4c generates and holds the equalization between the command X of terminal unit T1 and the command Y of the terminal unit T2 as the equalization information.

The terminal unit T2 is notified that the command X in the terminal unit T1 is equalized to the self command Y. The real data X and Y expressed by the commands X and Y and located in the different terminal units T1 and T2 are displayed as the single data.

As explained above, the desired scattered and incorporated real data may be coupled by equalization of the commands and the incorporated data may be processed, without recognizing coupling of real data, by the processing input for the one equalized command.

Figure 9A:
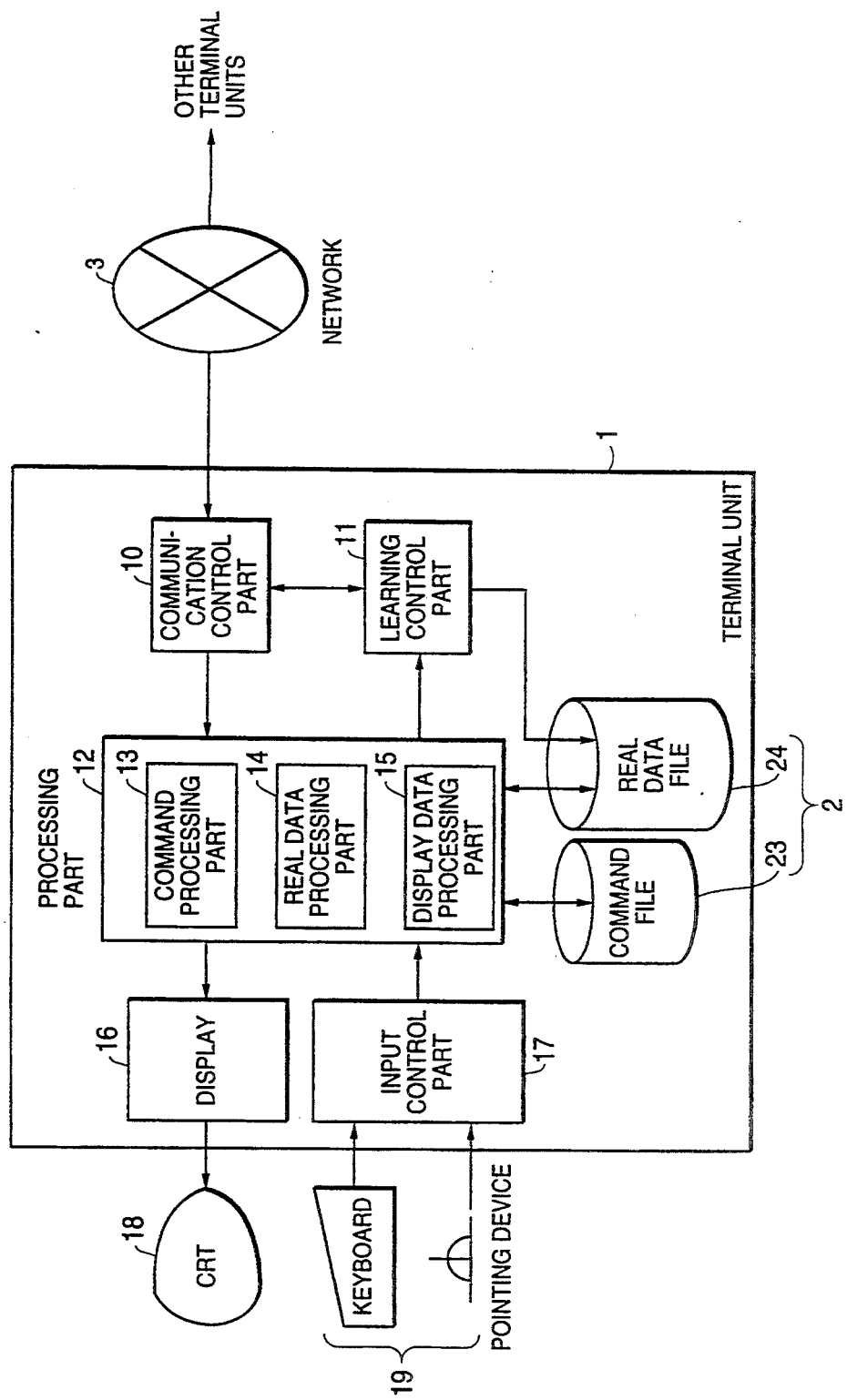
FIG. 9A is a structure of an embodiment of the real data control processing.

FIG. 9A shows a structure of embodiment of the principle structure shown in FIG. 8.

In FIG. 9A, the reference numeral 1 denotes terminal unit. The reference numeral 2 denotes a file provided in the terminal unit. The reference numeral 3 denotes the network.

The processing part 12 of terminal unit 1 executes various data processings (including command processing). The processing part 12 also requests communication with the other terminal unit to a communication control part 10 and learning processing to a-learning control part 11. Further, the processing part 12 executes processing of input code sent from an input control part 17. In addition, the processing part 12 is also provided with a command processing part 13, real data processing part 14 and display data processing part 15 for processing command, read data and display data.

The command processing part 13 generates a command from the real data stored in the real data file 24 and assigns such command as the command for expressing real data. This command is stored in the command file 23 and is controlled by the command processing part 13. Moreover, the command processing part 13 equalizes a couple of different commands as required (declares that the different commands are equalized) and notifies it to the command link center 4c.

The real data processing part 14 inquires about the existence of command equalized to the command to be processed to the command link center 4c through the communication control part 10 during the processing of command and retrieves and extracts the real data using a command based on the response from the command link center 4c. Namely, the real data expressed by the command to be processed is extracted from the real data file 24 of the self terminal unit based on the response using the relevant command. Moreover, the real data processing part 14 registers (stores) and controls the real data input from the self terminal unit 1.

On the other hand, in case the real data expressed the relevant command does not exist in the real data file 24 in the self terminal unit 1, the terminal unit 1 requests extraction of real data from the learning control part 11 by sending the command.

The display data processing part 15 executes processing (real data generating process) for a plurality of extracted real data for display and sends data to the display unit 18. The display part 16 converts the processed data to the data for display and displays it on the display unit 18.

The communication control part 10 establishes communication with the other terminal unit or command link center 4c through the network 3. Such communication includes inquiry to the command link center 4c requested by the processing part 12 and response to such inquiry (reception of command equalization information), real data request and response thereto (reception of real data) by the learning control part 11.

The learning control part 11 receives request from the processing part 12 and issues request for real data indicated by the equalized command to the other terminal unit. The other terminal unit, based on this request, extracts the relevant real data from the real data file 24 and sends it to the request issuing terminal unit 1. A plurality of real data extracted is written into the real data file 24 by the learning control part 11.

The real data written by this learning control part 11 exists as the data of the relevant terminal unit 1 within the real data file 24 so long as it is not deleted particularly. Accordingly, reference to the relevant real data can be realized without data transfer of the real data itself. Meanwhile, the command used for extraction of relevant real data is abolished without storage in the command file 23, upon completion of the writing operation. Namely, only the command assigned in the self terminal unit 1 is stored in the command file 23 and the command obtained from the command link center 4c is not stored therein.

The relevant real data is controlled substantially by the learning control part 11 and the real data processing part 14, which controls the real data file 24, cannot make reference thereto directly. Moreover, a user and processing part 12 does not (cannot) become aware of the existence of real data in the real data file 24.

For making reference to relevant real data by the real data processing part 14, the inquiry as mentioned above is issued to the command link center 4c and the access must be made to the real data file 24 by the command obtained as the answer to such inquiry. In this case, the real data is not transferred. This command is abolished after making the reference. Therefore, the number of times of reference of command is recorded in the command link center 4c and it is then used as the charging means for reference of real data.

The input control part 17 accepts an input from the input unit 19 and sends the input code to the processing part 12. The input unit 19 is used for inputting processing of command, equalization processing of commands, real data and data request to the other terminal unit.

When the real data is requested by designating the command from the other terminal unit, the real data processing part 14 in the processing part 12 accesses the real data file 24 with the relevant command to extract the real data and sends this real data to the request issuing terminal unit.

Moreover, as explained previously, the command link center 4c is actually one of the terminal units 1 and any terminal unit connected in the network 3 may be used as the command link center 4c. The command link center 4c only controls the command equalizing information. When the terminal unit 1 is used as the command link center 4c, the command equalization information is stored in an exclusive file. In case inquiry is issued to the command equalizing information by designating the command from the other terminal unit, the processing part 12 or command processing part 13 accesses the command equalizing information file with the incoming command to extract the command equalizing information and then sends it as the response to the inquiry issuing terminal unit.

For instance, when a terminal unit (assumed as T0) generates a display format screen (one "data") concerning incorporated data and opens such data for each terminal unit, the terminal unit T0 may be used as the command link center 4c for the incorporated data. Here, it is unnecessary to determine different command link centers 4c for each data and the terminal unit to be used as the command link center 4c may be fixed to the host terminal unit (host computer).

Moreover, each terminal unit inputs data (by changing the data) to the format screen of the opened display and equalizes such data with the command. Thereby, the real data is distributed and the distributed data base consisting of the single data can be formed easily through equalization of the commands.

Figure 9B:
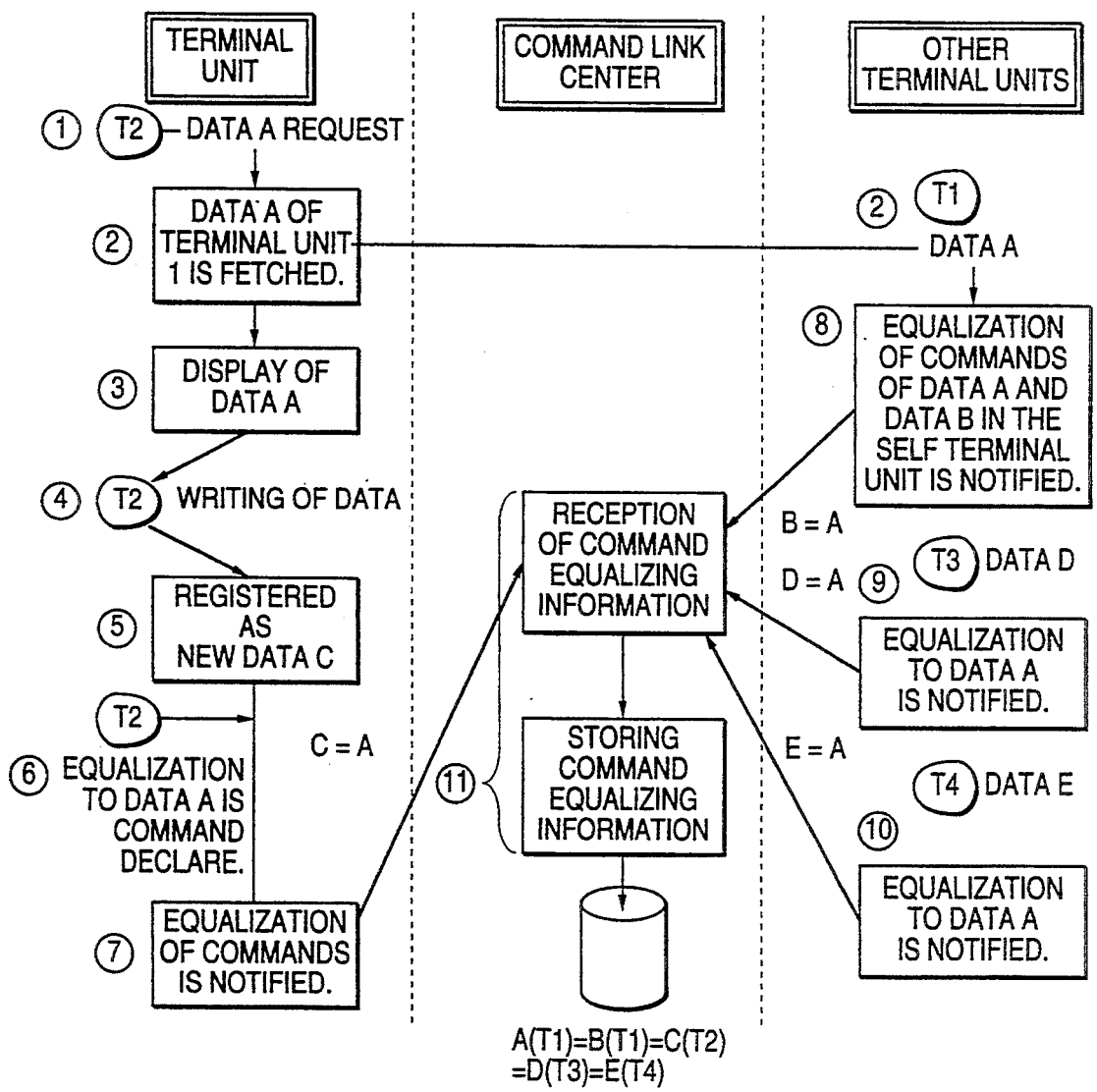
FIGS. 9B, 9C, 9D, 9E, 9F and 9G are diagrams for explaining processing contents of an embodiment.
Figure 9C:
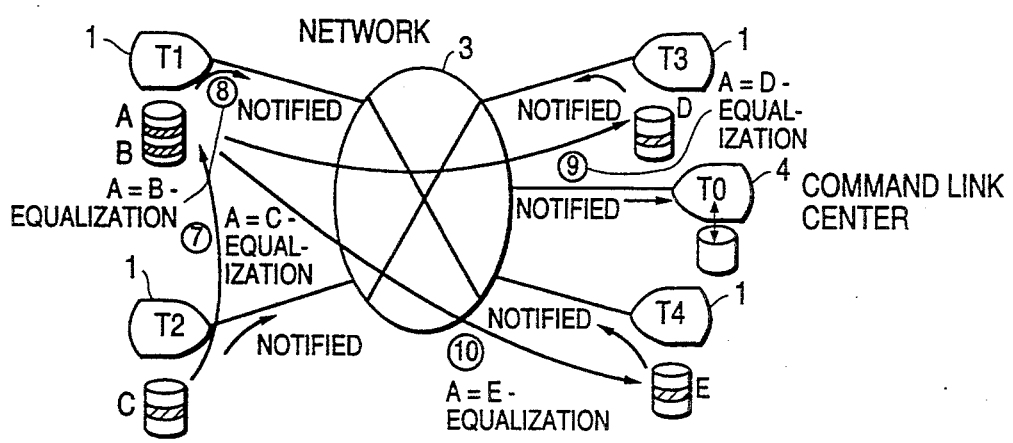
Figure 9D:
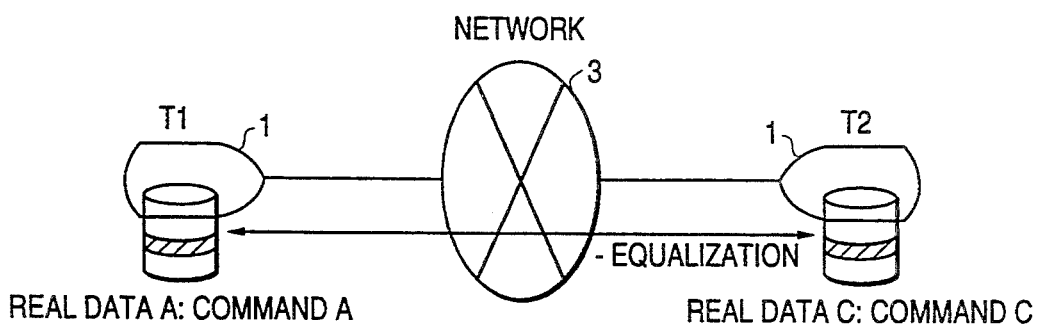
Figure 9E:
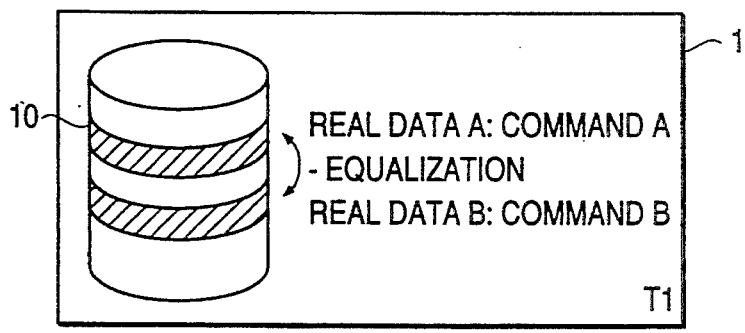
Figure 9G:
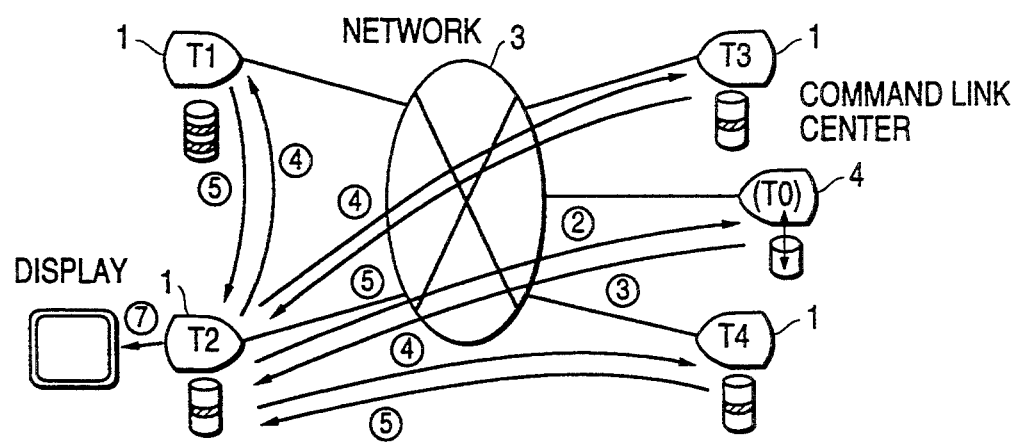
Figure 9F:
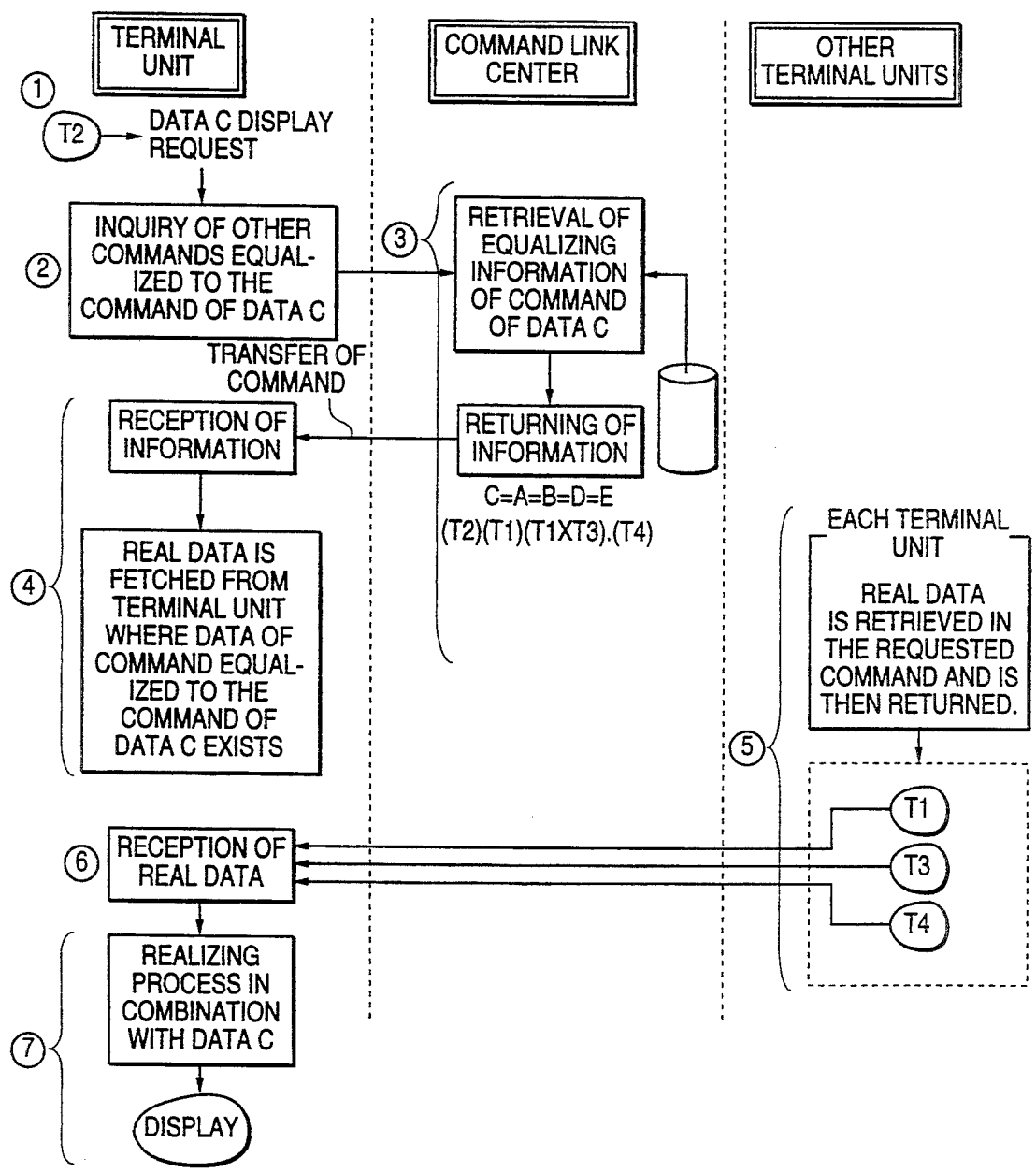

Operations of a structure shown in FIG. 9A will be explained with reference to FIG. 9B to FIG. 9G. FIG. 9B is a real data control processing flow. FIG. 9C to FIG. 9E are diagrams for explaining equalization of commands. FIG. 9F is a control processing flow of a plurality of real data. FIG. 9G is a diagram for explaining extraction of real data.

The real data control processing flow of FIG. 9B indicates particularly the equalization processing of commands (integration of real data, namely formation of distributed data base). In this example, the terminal unit T0 is assumed to operate as a command link center 4c and to be connected to the network 3 together with the terminal units T1–T4.

In case a terminal unit T1 generates a real data A and opens it, the real data A is used in the terminal units T2–T4 without particular inquiry to the command link center 4c or the terminal unit T1.

The flow of FIG. 9B will be explained hereunder by making reference to FIG. 9C to FIG. 9E.

① A request for data A is input first to the terminal unit T2 from the input unit 16.

② The processing part 12 of terminal unit T2 retrieves the real data file 24 using the command A. But, since the real data A does not exist, the processing part 12 asks the learning control part 11 for extracting the real data A. The learning control part 11 designates the command A, requests the real data to the terminal unit T1, fetches the data from the terminal unit T1 and writes such data to the real data file 24.

③ The display data processing part 15 executes the realizing process of the real data A and the display part 16 converts such data into the data to be displayed and displays the data A on the display unit 18.

④ The data A is altered by adding new data to the data A from the input unit 19.

⑤ A message that the "altered data A" is registered to the real data file 24 as the data C is input from the input unit 19. The command processing part 13 assigns the command C to the data C and registers the command C to the command file 23.

⑥ A message that the command C is equalized to the command A is input from the input unit 19.

⑦ The command processing part 13 declares that the command C is equalized to the command A and notifies it to the command link center 4c. The command processing part 13 generates the command equalizing information "C=A" or "C(T2)=A(T1)" and sends it to the command link center 4c.

As explained above, the distributed couple of real data A and C are equalized and used as the one data as shown in FIG. 9D. The real data A also exists in the real data file 24 of terminal unit T2 owing to the processing ②.

⑧ The terminal unit T1 equalizes the real data A existing in the real data file 24 to the real data B as shown in FIG. 9E. It can be realized, for example, by executing the processings ③ to ⑦.

⑨ The terminal unit T3 equalizes the command D to the command A in the same way as the processings ① to ⑦.

10 The terminal unit T4 equalizes the command E to the command A in the same way as the processings ① to ⑦.

11 Upon reception of the command equalizing information, the command link center 4c stores ti to the exclusive file for each reception.

Such processings may be summarized as shown in FIG. 9C and as a result, the command equalizing information becomes equal to "A(T1)=B(T1)=C(T2)=D(T3)=E(T4)".

Namely, the data A to E distributed in the terminal units T1 to T4 are processed as the one data.

FIG. 9F is a processing flow in case a plurality of real data is processed as a single data.

This processing flow shows the processing, particularly display process of the real data equalized by the processing shown in FIG. 9B.

① The data C display request is input to the terminal unit T2 from the input unit thereof 16.

② The real data processing part 14 of terminal unit T2 inquires about existence of command equalized to the command C to the command link center 4c.

③ The command link center 4c retrieves the equalizing information for the command C and returns the commands A, B, D and E or A(T1), B(T1), D(T3) and E(T4) to the terminal unit T2 based on the command equalizing information "C(T2)=A(T1)=B(T1)=D(T3)=E(T4)".

④ Upon reception of the equalized command, the processing part 12 of terminal unit T2 ask the learning center 11 for extraction of real data corresponding to the command. The learning center 11 uses these real data and requests the real data A and B to the terminal T1, real data D to the terminal unit T3 and real data E to the terminal unit T4. Moreover, the real data processing part 14 may extract the real data C from the real file 24.

⑤ The processing part 12 or real data processing part 14 of the terminal units T1, T3 and T4 extract the real data A, B, D, E corresponding to the requested commands from each real data file 24 and return the data to the terminal unit T2.

⑥ The real data A, B, D and E received by the learning center 11 of terminal unit T2 are registered in the real data file 24.

⑦ The real data processing part 14 extracts the real data A, B, D and E from the real data file 24 using the equalized commands and sends it to the display data processing part 15 together with the real data C. The display data processing part 15 displays the real data A to E on the display unit 18.

Such processings may be summarized in FIG. 9G. As a result, the real data A to E having the equalized commands is processed (displayed) as the one data. As explained above, all real data having equalized commands may be processed as the one data, without consciousness, by designating the one of the equalized commands.

Such processing may be realized even when any command from A to E is designated from any terminal unit among the units TI to T4. However, the commands to be detected from the terminal units T1 to T4 are restricted.

The display data processing part 15 executes the realizing processing in accordance with the display mode designated in the display request. In case the total display of the real data A to E is requested (OR input), processing is carried out so that the real data A to E are displayed.

In this case, if a plurality of data are overlapped on the same I position on the display screen, processing is carried out so that the display is realized in the window format. The display may also be sequentially made by the click operation with a pointing device, etc. after display is once made. Meanwhile, display of only the equalized real data A to E is requested (AND input), the processing is carried out so that only the equalized portion is displayed.

As explained above, data may be written from any terminal unit for the common (opened) data (format) A and such data may be displayed as data from any terminal.

After the processing of FIG. 9F, when the data C display request is input again from the terminal unit T2, the following processings are carried out.

First, the equalized commands A, B, D and E are obtained. Next, the real data file 24 is retrieved by the commands A to E to extract the real data A to E. Therefore, data transfer is not carried out.

Next, the data A to E are displayed as in the case of the processing ⑦ of FIG. 9F.

As explained previously, the incorporated data A to E may be obtained without data transfer. Meanwhile, the reference to the data B to E not opened is impossible without going through the command link center 4c from the terminal units other than those generating the relevant data.

Therefore, the real data is protected and safe, and any problem does not occur in the charging.

According to the invention indicated in the embodiments shown in FIG. 9A to FIG. 9G, data may be expressed by commands and a plurality of real data distributed in plural terminal units may be processed as a single data by equalizing the commands in the real data control processing in the distributed data base. The distributed data base system may be formed easily. Moreover, the processing utilizing the distributed data base may be realized easily and at a high speed.

Figure 10:
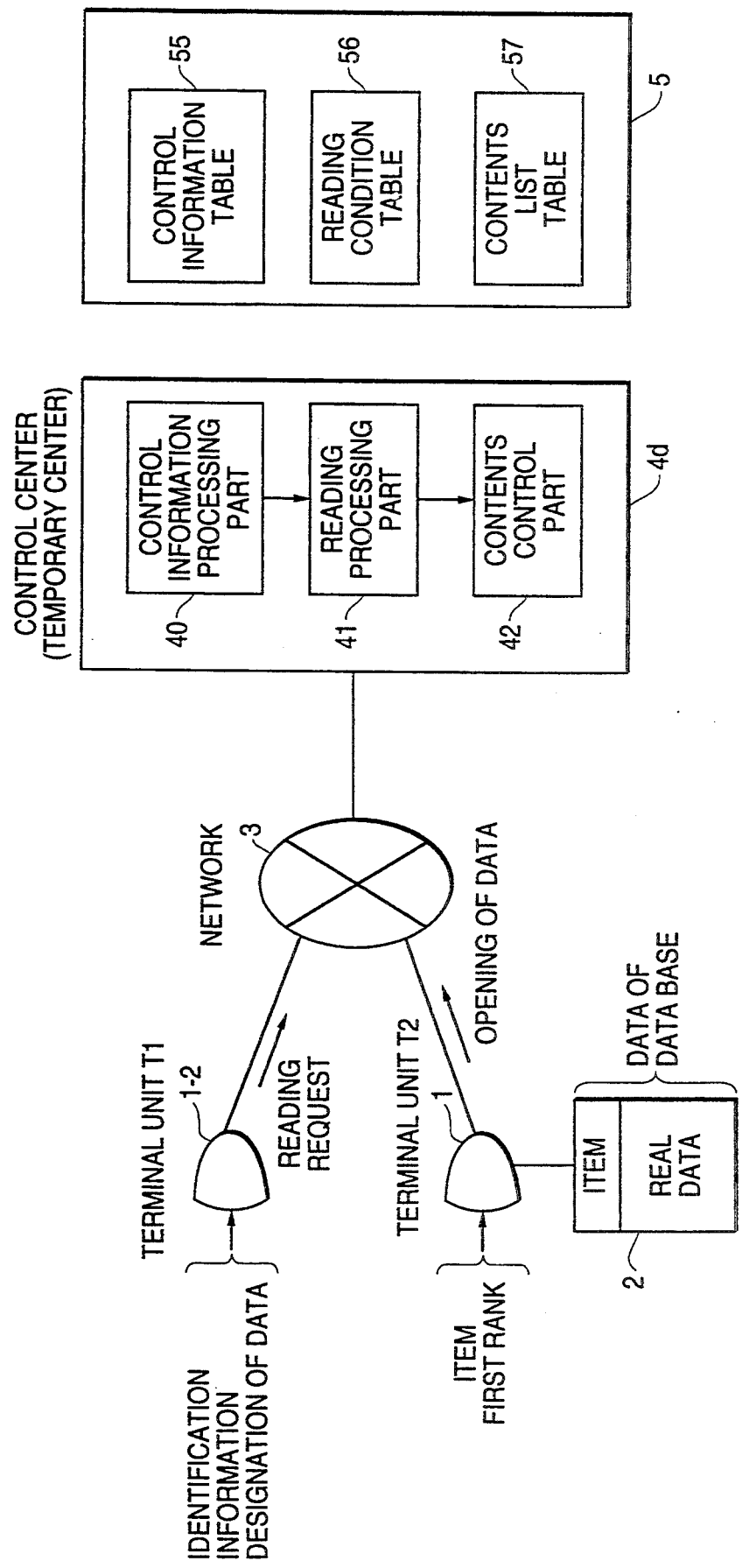
FIG. 10 is a basic structure of an embodiment for realizing security control.

A structure of the embodiment to realize the object to execute security control in accordance with the degree of importance of the open data in the distributed data base system of the present invention is shown in FIG. 10.

In FIG. 10, reference numeral 1 denotes terminal unit (T1 and T2). Reference numeral 3 denotes the network. Reference numeral 4d denotes the control center for security control (temporary center). Reference numeral 5 denotes the file provided in the control center to store the tables for various controls.

Tables provided in the file 5 will be explained.

Contents list table 57:

Formed by a list of information necessary for reading the data opened to the other terminal units, for example, items (item names) of open data and storing position.

Reading condition table 56:

Formed by information to allow or not to allow the reading operation, namely the open data items and the ranks of importance given to the items (this rank is called the first rank (level)).

Control information table 55:

Formed by information for deciding qualification for access and allowing or not allowing the reading operation, namely identification information such as personal ID, password and keyword, etc. and personal rank (this is called the second rank (level)).

The first and second ranks are set in plural steps in accordance with the open data and importance of identification information.

Operations of FIG. 10 will be explained. The terminal unit T1 inputs the request for reading designating the open data in order to read the open data 2 of the other terminal units and then inputs the identification information. This input is sent to the control center 4d through the network 3. The control center 4d extracts the first and second ranks corresponding to the open data 2 designated respectively and identification information input from the leading condition table 56 and control information table 55 based on such input. Next, two ranks are collated, adequacy or inadequacy of reading is decided based on the result of collation and thereby the reading is allowed or not allowed. For instance, when the second rank is higher than the first rank, the reading of the contents list table 57 is allowed for the terminal unit T1. In concrete, the contents list table 57 is sent to the terminal unit T1 through the network 3. Thereby, the terminal unit T1 can obtain the information for reading the open data 2. Thereafter, terminal unit T1 accesses the terminal unit T2 through the network 3 to read the open data 2.

On the other hand, in case the second rank is lower than the first rank, the reading of the contents list table by the terminal unit T1 is not allowed. Therefore, the terminal unit T1 cannot know the storing position of the open data 2 and cannot read it.

As explained above, the qualification for reading is restricted for the open data 2 in accordance with the importance of the data.

FIG. 10 will be explained in more detail. The open data of terminal unit T2 is formed by item and real data as shown in the figure. Even when it is the open data 2, the real data thereof exists only in the terminal unit T2 and the item exists in both terminal unit T1 and control center 4d.

The terminal unit T1 holds therein the data in the data base and decides whether it is opened to the other terminal units or not and then executes the necessary processings. Namely, the terminal unit T1 does not register the non-open data to the control center 4d. For the open data 2, the corresponding rank (first rank), self terminal number, storing position of relevant data are sent to the control center 4d. Therefore, the first rank indicates an importance degree of open data. For instance, in the case of the company data base, such importance degree includes "three or more years from start of working in this company" (to be allowed to read the open data) and "section chief or higher".

The terminal unit T1 allows the other terminal unit T2 making access with the information such as item and storing position to read the requested open data and sends data 2 to such terminal unit T2.

The control center 4d is one of the terminal units connected to the network 3 and is provided with following processing parts.

A control information processing part 40 makes reference to the control information table 55 based on the preset identification information of a terminal unit (personal user) and preset rank (second rank) corresponding to such information, checks the qualification of personal information. When a user has the qualification (data exists in the control information table 55), the control information processing part 40 extracts the corresponding second rank and sends it to a reading processing part 41.

The reading processing part 41 generates and holds a reading condition table 56 in accordance with registration of open data 2 from the terminal unit 1.

In this case, the item transmitted as the open data and corresponding rank (first rank) are registered in the reading condition table 56.

The reading processing part 41 makes reference to the reading condition table 56 and extracts the rank (first rank) corresponding to relevant personal information.

This first rank is collated with the second rank sent from the control information processing part 40. When the result of collation is matched with the predetermined result, for example, the second rank is "three years from start of working for this company" and the first rank is "three or more years from start of working for this company", permission for reading is notified.

The contents control part 42 transmits contents of the contents list table 57 to the terminal unit 1 accessed in accordance with the permission issued from the reading processing part 41. In this case, the contents transmitted are limited only to that corresponding to the (item of) open data 2 which the terminal unit 1 requests to read.

Thereby, the reading of the other open data 2 may be prevented. FIG. 11A is a diagram for explaining tables.

As shown in (A), the control information table 55 stores, for each user, the name, personal ID (identification number) and rank and moreover stores password or keyword, etc. to be used by this user.

The reading condition table 56 is indicated in (B) and the items correspond to respective rank for each opened table 2.

The contents list table 57 is shown in (C) and the item, terminal unit number and storing position of each opened table 2 are stored in this table.

Figure 11B:
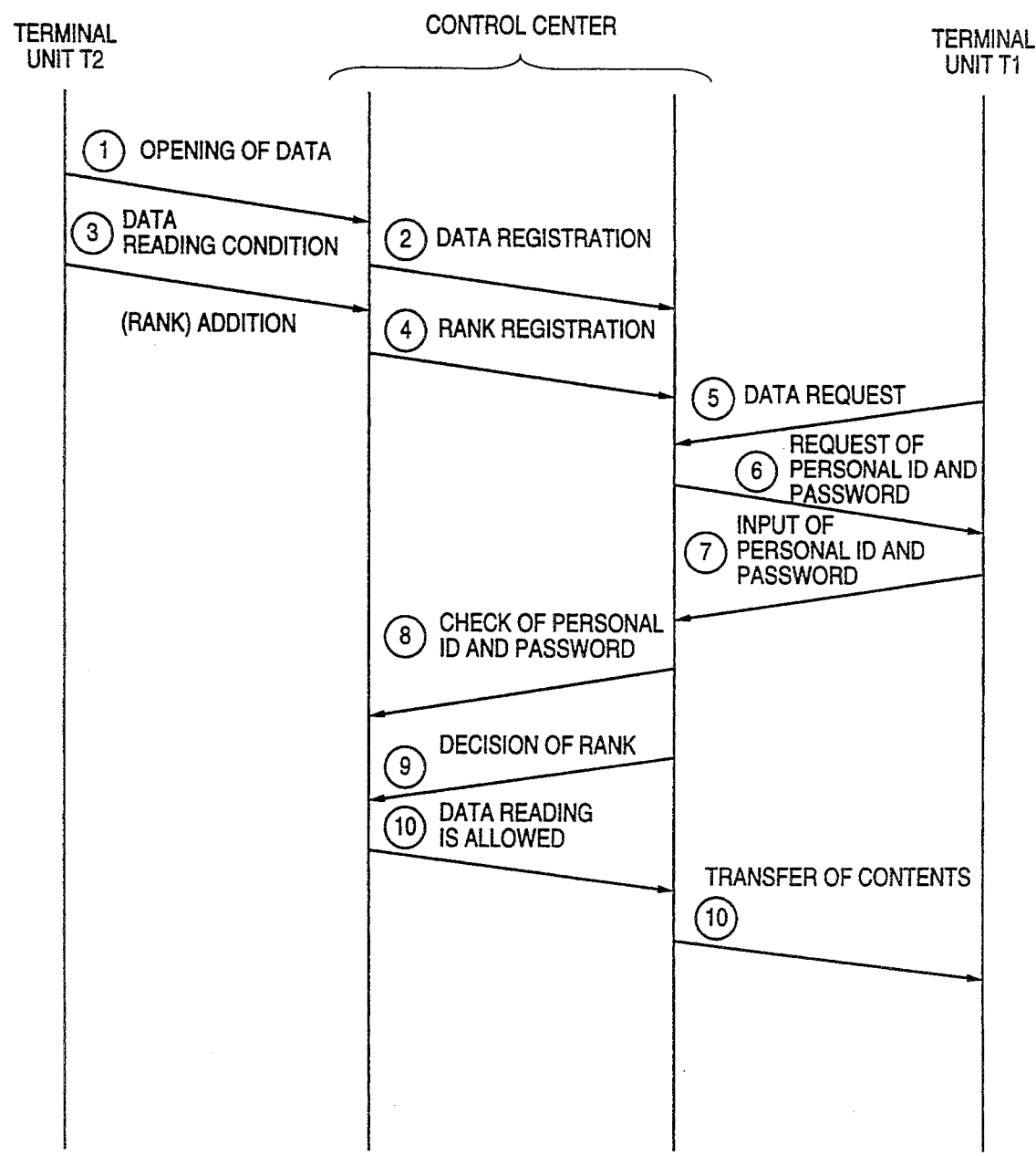
FIG. 11B is a diagram for explaining connecting procedures.
Figure 11C:
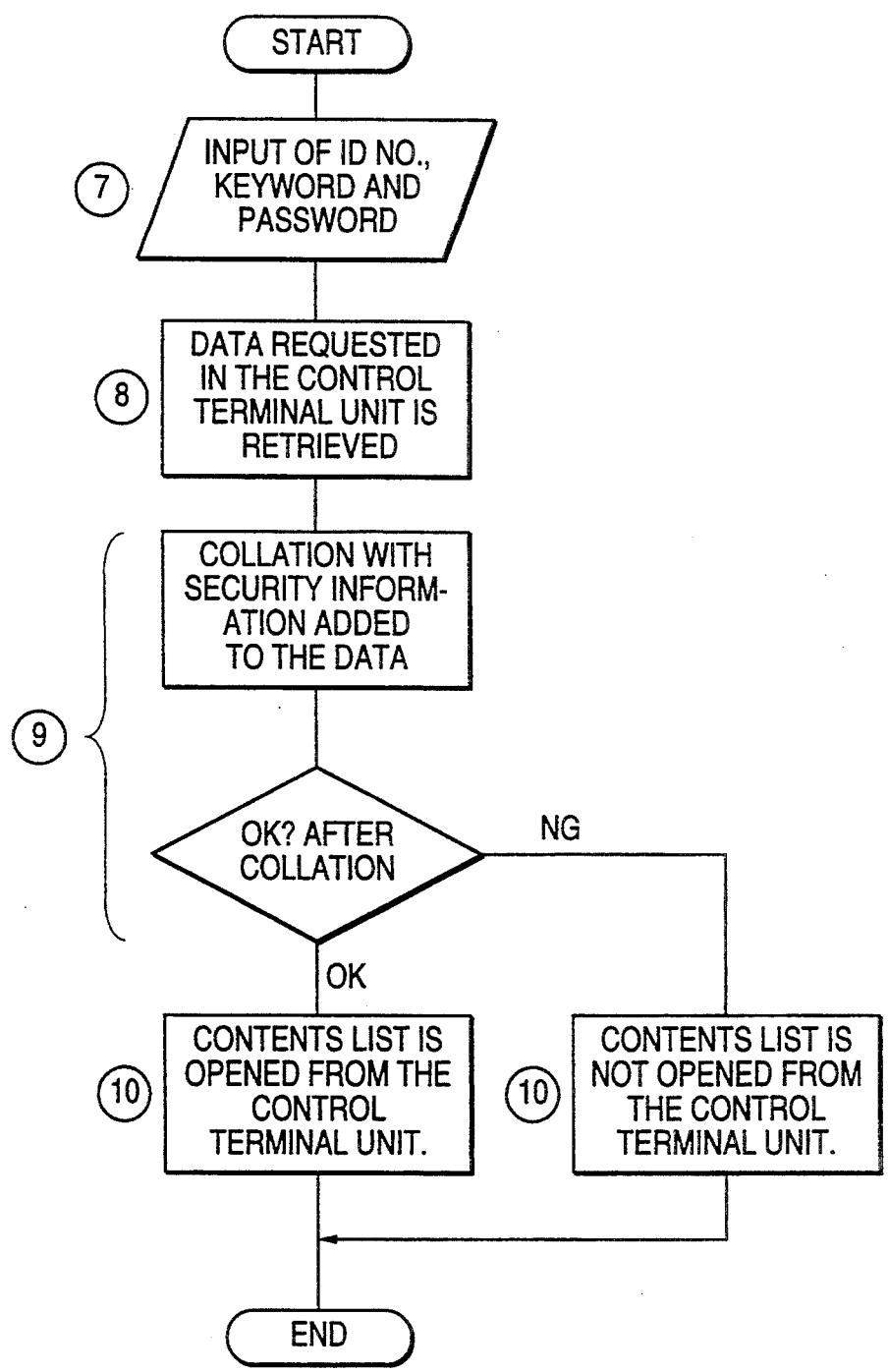
FIG. 11C is a data control processing flow diagram.

FIG. 11B and FIG. 11C are diagrams for explaining the connecting sequence and a data control processing flow.

The connecting sequence and data control processing are explained sequentially.

① The data generated by the terminal unit T2 (refer to FIG. 10) is opened as the opened data 2 and necessary data is transmitted to the control center 4d.

② The contents control part 42 of control center 4d registers the transmitted information to the contents position table 57 and the reading processing part 41 registers the transmitted items to the reading condition table 56.

③ The terminal unit T2 transmits the rank of open data to the control center 4d.

④ The reading processing part 41 of the control center 4d registers the rank to the predetermined position of the reading condition table 56.

⑤ The other terminal unit T1 issues the request for reading the open data 2 to the control center 4d through the network 3.

⑥ The control center 4d requests input of identification information to the request issuing terminal unit T1 through the network 3.

⑦ The terminal unit T1 inputs the identification information to the control center 4d through the network 3.

⑧ The control information processing part 40 of the control center 4d retrieves the control information table 55 and judges the qualification of identification information. When the terminal unit T1 has the qualification, the corresponding second rank is extracted from this table 55.

The reading processing part 41 retrieves the reading condition table 56 and extracts the corresponding first rank.

⑨ The reading processing part 41 collates the first and second ranks and decides possibility or impossibility of reading operation.

⑩ When the reading is allowed the contents control part 42 extracts contents of the contents list table 57.

The control center 4d sends such contents to the request issuing terminal unit T1 through the network 3.

When the reading is not allowed, the control center 4d does not send the contents.

Thereafter, the terminal unit T1 requests the open data to the terminal unit T2 using the contents received.

Thereby, since the reading qualification can be restricted in accordance with a degree of importance of the open data by controlling the information for reading open data in the control center using the rank, the security of open data can be established and the data base may be utilized by accelerating opening of data.

Next, the technique for controlling the data base by grouping the terminal units connected in the network of the distributed data base for convenience of using such data base and the technique for using data between groups will be explained with reference to FIG. 12 and FIG. 13A to FIG. 13C.

Figure 12:
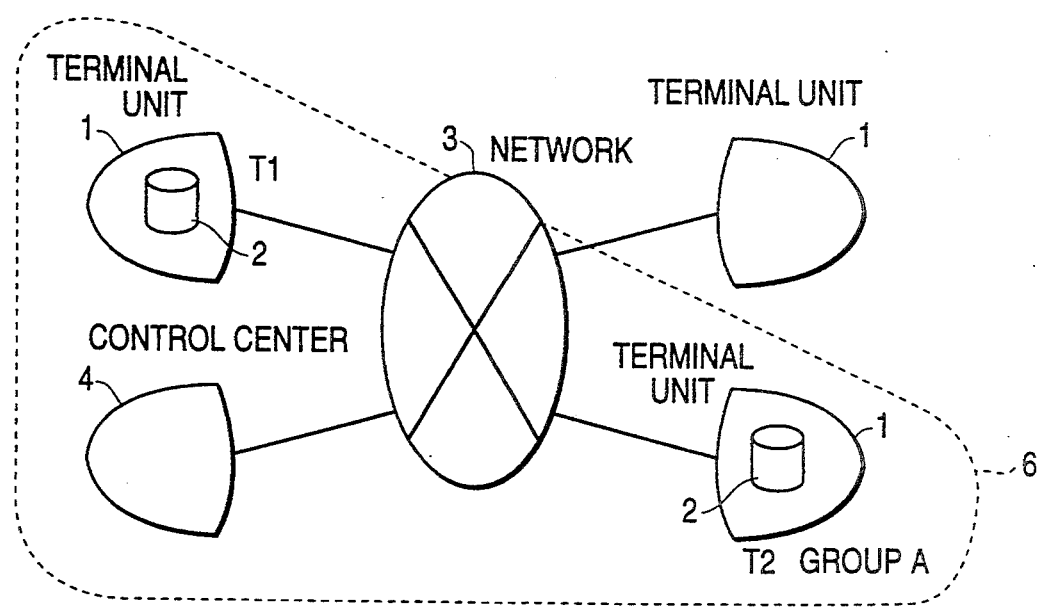
FIG. 12 is a system structure in which the terminal units are grouped.

FIG. 12 is a total structural diagram. In FIG. 12, the reference numeral 1 denotes terminal unit (T1, T2 and T3). The reference numeral 2 denotes data base to be held in the distributed terminal units. The reference numeral 3 denotes network. The reference numeral 4 denotes one terminal unit operating as the control center (temporary center) having the control function. The reference numeral 6 denotes boundary of group.

In this structure, the terminal units 1 holding a plurality of distributed data bases are connected in the network 3 just like the distributed data base system explained above, and a predetermined number of terminal units 1 form a group (group A in the example of figure). The one terminal unit of the group A functions as the control center 4 and is provided with the information required for control. The terminal unit 3 does not belong to the group A. The information required for control is which terminal unit holds which data and which data should be opened or not opened. In some cases, the data such as password may be included to check the terminal units and users as the control information.

The terminal unit 1 forming the group A requests retrieval for the data of the other terminal units to the control center 4 through the network 3. The control center 4 checks, when the network 3 is the public network, whether the request issuing terminal unit 1 belongs to the group A or not (by receiving the check data such as password,etc. from the terminal unit 1). When check is not rejected, the control center retrieves data based on the request and sends the result of retrieval (for example, the terminal unit number holding the data) to the request-issuing terminal unit. The request issuing terminal unit 1 makes reference to the data from the data base of the terminal unit 1 holding the data base on the basis of the result received.

The structure of FIG. 12 will further be explained. The terminal unit T1 is an independent computer system. Therefore, the terminal unit T1 and control center 4 are mutually connected through the network forming a computer network. The terminal unit T1 and control center 4 are terminal units belonging, for example, to a company and distributed in local areas and therefore these terminal units form a group and use the data base in common. Meanwhile, the terminal unit T3 is connected to the network but belongs, for example, to another company.

The control center 4 is provided with an information file for control. The control information is stored in the information file for each data (information) of data base 2 or each data to be held by the one terminal unit. The one control information is formed by name of information, abbreviation of control, keyword for retrieval, comment storing list, terminal unit ID (terminal unit number), part ID (data storing position), charging data, data for deletion, possibility or impossibility of opening, data item of data base 2, etc. The data of data base 2 is held in the distributed terminal units.

Figure 13A:
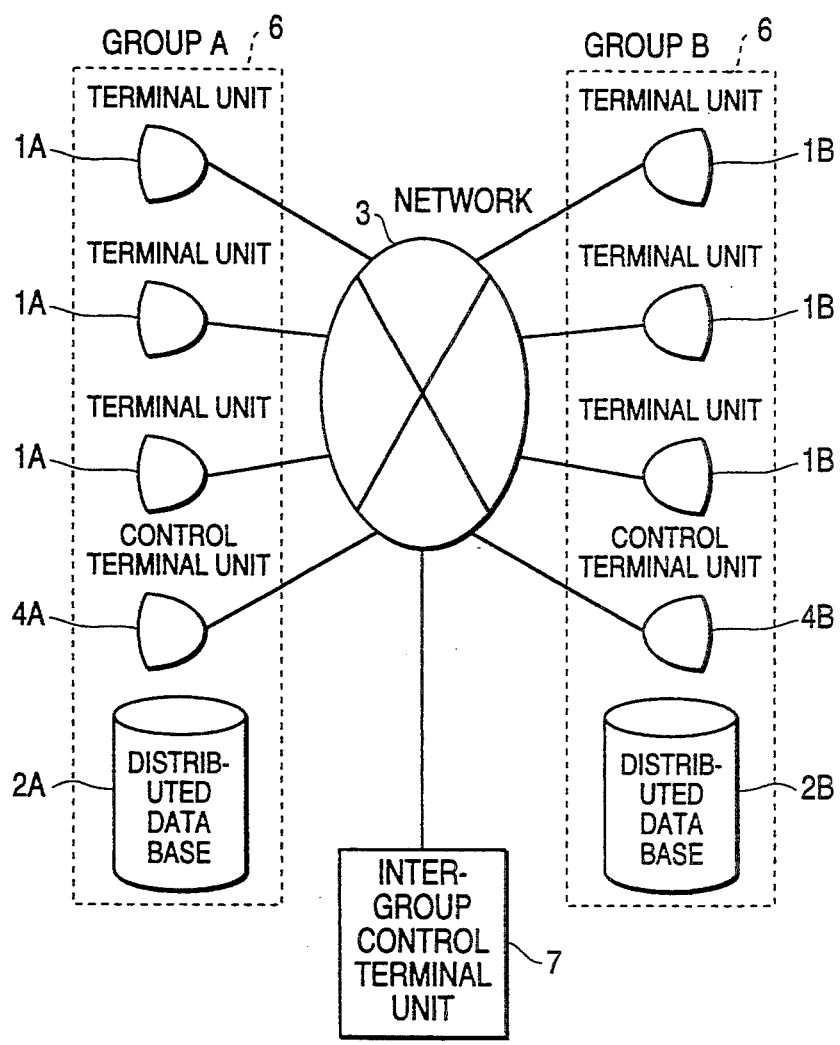
FIG. 13A is a structure of an embodiment of a distributed data base system comprising a plurality of groups.

FIG. 13A shows an embodiment of a distributed data base system including a plurality of groups.

In this figure, 1A, 1B, 4A, 4B, 2A and 2B indicate the terminal units, control centers and data bases respectively belonging to the group A and group B. Reference numeral 7 denotes an intergroup control terminal.

In this example, the groups A and B hold different data bases 2A and 2B by distributing to a plurality of terminal units 1A and 1B. The predetermined data among the data of data base 2A of group A are opened also to the terminal units not belonging to group A. Namely, reference is also allowed to the terminal unit 1B of group B. On the contrary, it is also applied to the data base 3B of group B.

Reference to the data bases 3A and 3B between different groups A and B is certainly carried out through the intergroup control terminal unit 7. In this case, direct transmission or reception of data between the terminal units 1A and 1B or between control centers 4A and 4B is not allowed.

The intergroup control center 7 is formed by the terminal unit connected in the network 3 and is provided corresponding to a plurality of groups, which are allowed to make reference to the data bases 3A and 3B. The intergroup terminal unit 7 carries out the processing between a plurality of groups A and B, similar to that conducted by the control centers 4A and 4B in the respective groups. Namely, the intergroup terminal unit 7 controls reference to the data bases 3A and 3B between the groups A and B and also controls communication between the groups A and B for the reference.

Therefore, the data is gathered from the intergroup control centers 4A and 4B and are registered to the intergroup control information file (not illustrated).

Moreover, when the control centers 4A and 4B requests retrieval for making reference to the data bases 3B and 3A of the other groups B and A, the intergroup control terminal 7 retrieves the intergroup control information file and sends the result to the request issuing control centers 4A and 4B.

Moreover, when the control centers 4A and 4B requests data transfer to the control centers 4B and 4A of the other groups B and A, the intergroup control terminal 7 receives the data from the request issuing terminal unit and transfers such data to the destination.

Such processing is executed as the processing between the intergroup control terminal unit 7 and the control centers 4A and 4B of the groups A and B. Therefore, the processing is always carried out through the control centers 4A and 4B without direct communication between the terminal units 1A and 1B and the intergroup control terminal 7.

For registration of control information, the control centers 4A and 4B sends only the control information about the open data among the control information thereof to the intergroup control terminal unit 7.

Figure 13B:
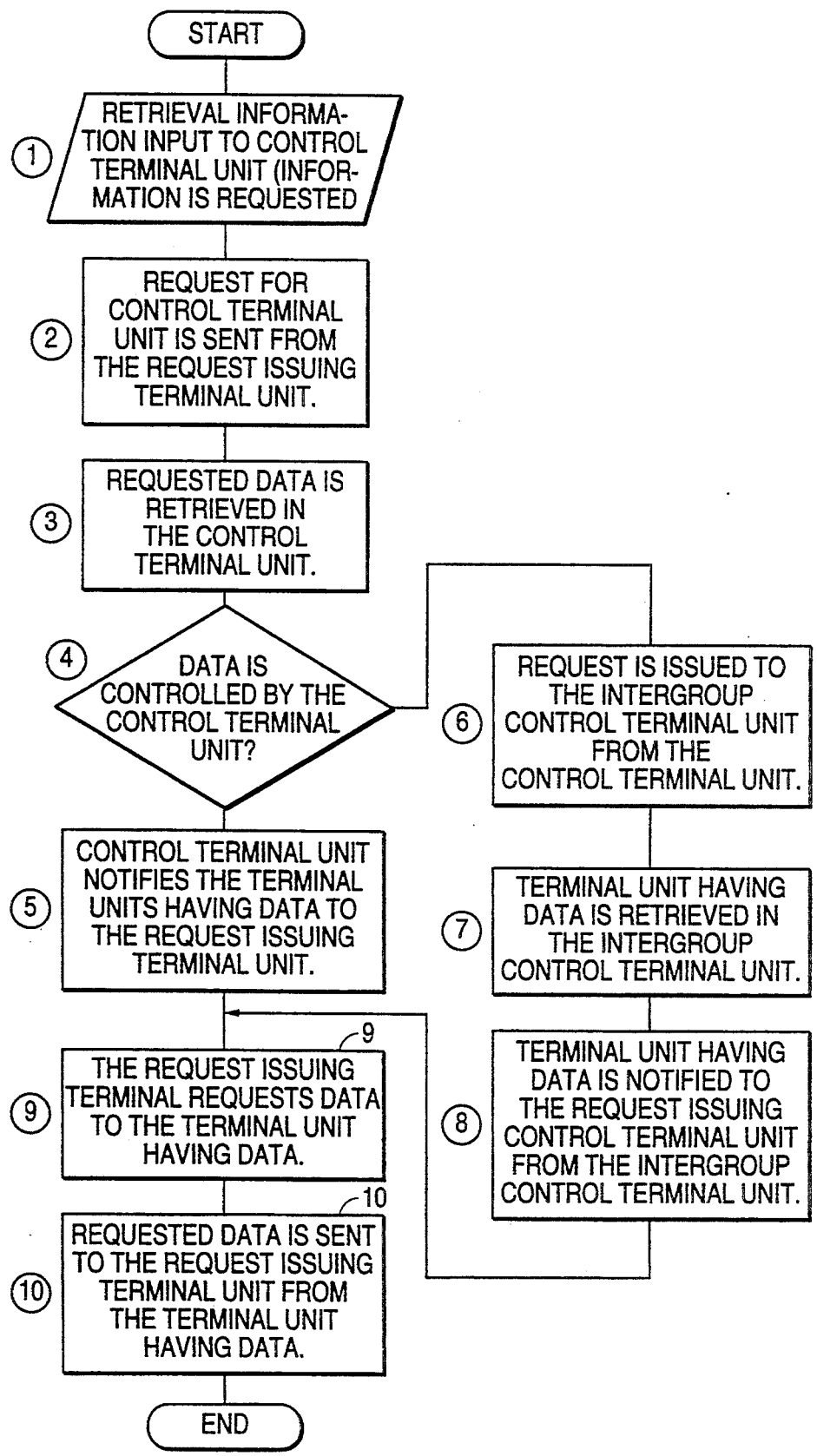
FIG. 13B is a diagram of a data base control processing flow between groups.

Next, the data base control processing flow between the groups in FIG. 13A will be explained with reference to FIG. 13B.

① The retrieval information for retrieving the data to be referred such as the name of information is input from a user to the one terminal unit 1A of the group A.

② A relevant terminal unit (request issuing terminal unit) 1A request retrieval for reference to the control center 4A of the group A to which the relevant terminal unit belongs through the network 3.

③ Based on this request, the control center 4A retrieves self control information file.

④ As a result of retrieval, it is checked whether the control information exists (whether it is the data to be controlled by the control center 4A) or not for the designated data. Namely, it is checked whether the relevant data is the data in the group A or not.

(5) When the data is to be controlled by the control center 4A, the terminal unit ID, etc. of the terminal unit 1A holding such data as the result of retrieval is sent to the request issuing terminal unit 1A through the network 3.

(6) When the data is not included in the data controlled by the control center 4A, the control terminal unit 4A requests retrieval for reference of data to the intergroup control terminal unit 7 through the network 3.

(7) Based on this request, the intergroup terminal unit 7 retrieves the intergroup control file. In this case, the intergroup terminal unit 7 retrieves the data base 2 distributed in the terminal units of group B other than the group A.

(8) The intergroup control terminal unit 7 notifies the terminal unit ID number, etc. of the terminal unit 1B holding the data as the result of retrieval to the request issuing control center 4A.

The control center 4A sends a result of retrieval to the request issuing terminal unit 1A through the network. When the data is not open data, the intergroup control terminal unit 7 sends that data does not exist (or data is not open data) as the result of retrieval to the request issuing terminal.

(9) The request issuing terminal unit 1A accesses the terminal unit 1A or 1B holding the relevant data through the network 3 on the basis of the result of retrieval by the control center 4A or intergroup control terminal unit 7 in order to request the relevant data.

In this case, the request is issued to the terminal unit 1A without via the control center 4A.

Meanwhile, the request is always issued to the terminal unit 1B through the control center 4A, intergroup control terminal 7 and control terminal unit 4B.

(10) The terminal unit 1A or 1B having received the request sends the data to the request issuing terminal unit 1A through the network.

In this case, the relevant data is transmitted through the path similar to that used by the processing (9).

Figure 14:
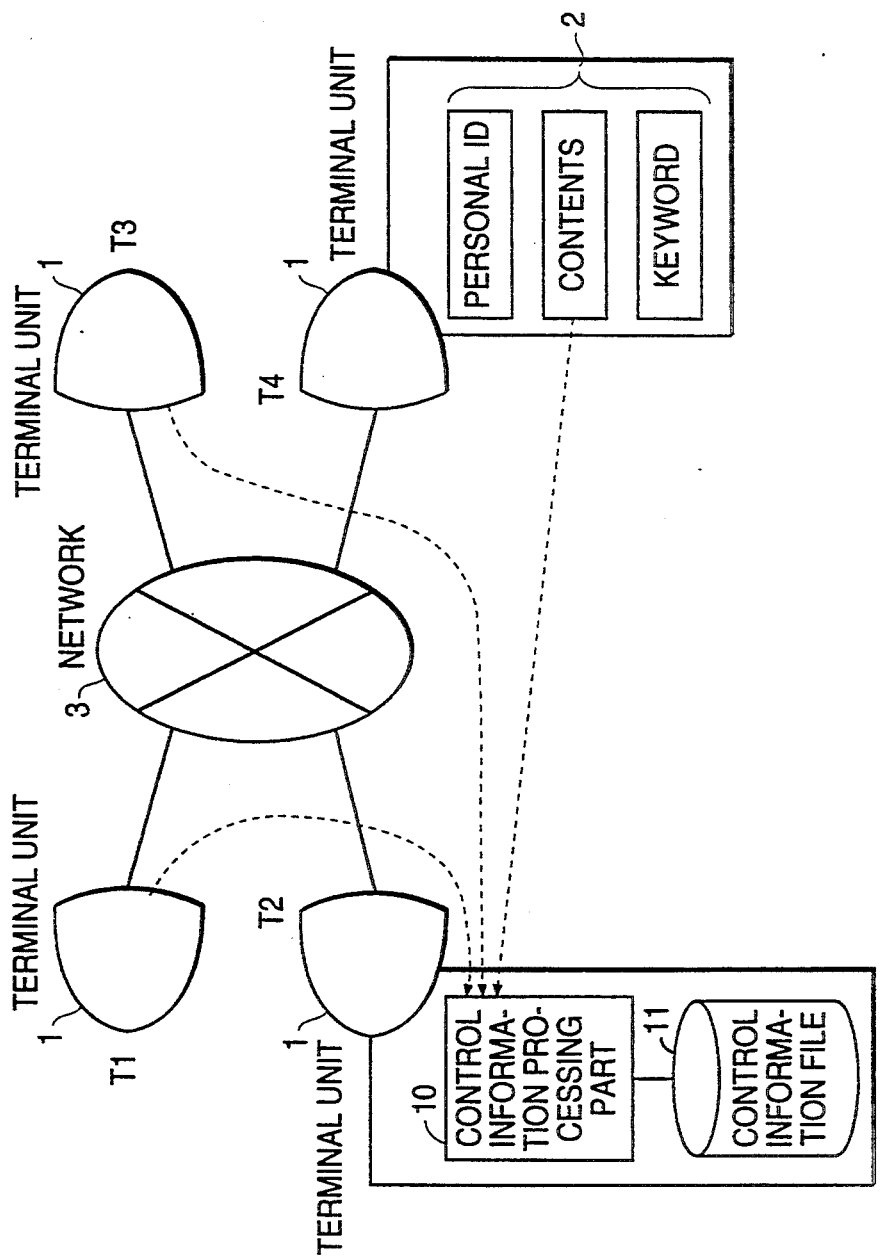
FIG. 14 is a basic structure of an embodiment for a distributing center load.

Next, the basic structure of the embodiment of the present invention, which realizes distribution of load and risk during failure for controlling the distributed data base system will be explained with reference to FIG. 14.

In this figure, reference numeral 1 denotes terminal unit (T1-T4). Reference numeral 2 denotes information intrinsic to the self terminal unit. Reference numeral 3 denotes network. Reference numeral 5 denotes control information file.

Total operation of FIG. 14 will be explained hereunder. Upon declaration for control of data base concerning predetermined items in the control information, the control information processing part 10 of the terminal unit T2 gathers information about predetermined items from the other terminal unit 1 and stores such information to the control information file 11. Thereafter, this control information processing part 10 controls data base concerning the predetermined items of distributed data base using the control information file 11 storing the predetermined items. Namely, the terminal unit T2 is considered to function as the control center for the predetermined items from the other terminal units.

Upon declaration for the above processing, namely control of data base concerning a particular one or pieces of control information, each terminal unit T1 is capable of operating the control information center for respective items by gathering control information.

For instance, in case the terminal unit T1 controls the item of "personal ID", the terminal unit T3 controls "contents" and the terminal unit T4 controls "keyword", the control information processing part 10 of each terminal unit T1, T3 and T4 respectively generates the control information or control information file 11 for personal ID, contents and keyword. As the control information center of the distributed data base system, the command control center (FIG. 6) for controlling commands and common commands and the command link center (FIG. 8) for controlling equalized data of commands are also included in addition to those explained above.

An embodiment of FIG. 14 will be explained with reference to FIG. 15A to FIG. 15I.

In FIG. 15A, the reference numeral 1 denotes a terminal unit formed by the processing apparatus. The reference numeral 11 denotes control information file. The reference numeral 2 denotes data base and the reference numeral 3 denotes network.

The processing apparatus forming the terminal unit 1 is formed by a central processing unit (CPU) and a memory and operates as an independent computer and a computer network may be formed by a plurality of terminal units 1.

The terminal unit 1 generates and stores a data base 2 as required. The data base 2 is given the contents and/or keyword. The storing position of relevant data base 2 may be detected from the contents and keyword. Information concerning the contents includes, in addition to contents, position information of data base 2 and label/level (rank) of the data base 2. Information concerning the keyword includes, in addition to keyword, position information of data base and label/level of data base 2. Label/level is used for checking qualification of a person who has made access for security of data.

Moreover, the terminal unit 1 has the information about personal ID for users using relevant terminal unit 1. This information includes, in addition to the personal ID, the label/level of section ID and personal ID.

The control information processing part 10 is formed by a center declaration processing part 10a, retrieval processing part 10b and center alteration processing part 10c.

The center declaration processing part 10a declares control of data base, gathers and stores data for determined items in the control information. Namely, this part declares (notifies) start of control for the relevant item from this timing together with the self terminal number to each terminal unit 1, and thereafter gathers relevant information from the terminal units 1 notified to generate a control information file 11. Thereby, the information concerning relevant items is centralized to the one terminal unit from each terminal unit 1 in the group. Accordingly, for relevant items, the one terminal unit 1 operates as the control center. As explained above, the center declaration processing part 10a establishes the control center for relevant item.

The retrieval processing part 10b retrieves the self control information file 11, checks whether reference to the data base 12 is allowed or not based on the result of retrieval and asks the terminal unit 1 providing the data base 2 for reference for retrieving such data base 2 only when the reference is allowed. Retrieval of control information file 11 is carried out in accordance with input of commands, name (contents) and keyword of data base in case relevant control information file 11 is provided for personal ID, contents and keyword. This input can also be realized from any terminal unit 1 (T1–T4 of FIG. 1) and on the other hand, the retrieval is carried out only by the retrieval processing part 10b of the terminal unit 1 as the control center of relevant items.

Moreover, the retrieval processing part 10b checks whether reference is allowed or not based on the comparison of label/level of personal ID with that of data base 2 designated for reference. The label/level of personal ID is obtained from the control information file 11 for personal ID.

Therefore, the retrieval processing part 10b accesses the terminal unit 1 as the control center for personal ID. Moreover, the label/level of data base 2 can be obtained from the control information file 11 for self contents or keywords. Accordingly, the retrieval processing part 10b for executing such processing belongs to the terminal unit 1 as the control center for contents or keywords.

The functions of each control center may be summarized as follow from the above explanation.

The personal ID control center gathers the information about personal ID such as personal ID of the member in the group, section ID and label/level of personal ID from the each terminal unit 1 of group and controls such information.

The contents control center gathers information about contents such as contents and label/level of each data base 2 in the group and controls contents of each data base in the group. Moreover, the label/level of data base 2 is collated with the label/level of personal ID.

The keyword center executes the processing like the contents control center for the keywords of each data base 2 in the group.

The center alteration processing part 10c transfers the function of the terminal unit 1 as the control center to the other terminal units 1 for altering the control center. Therefore, the center alteration processing part 10c checks whether the function and operation of the center controlled by the terminal unit 1 to become the control center are possible or not. When such function and operation are possible, the self control information file 11 is transferred to the terminal unit 1, which becomes the control center.

Next, the distributed control processing of data base will be explained with reference to FIGS. 15B to 15I.

In the following explanation, the terminal units T1, T2 and T3 operate respectively as the personal ID control center, contents control center and keyword control center. The data to which reference may be made is assumed to exist in the terminal unit T2. Moreover, a user may make the reference to the data base 2 from the terminal unit T4.

First, the processing for establishing each control center will be executed.

Figure 15B:
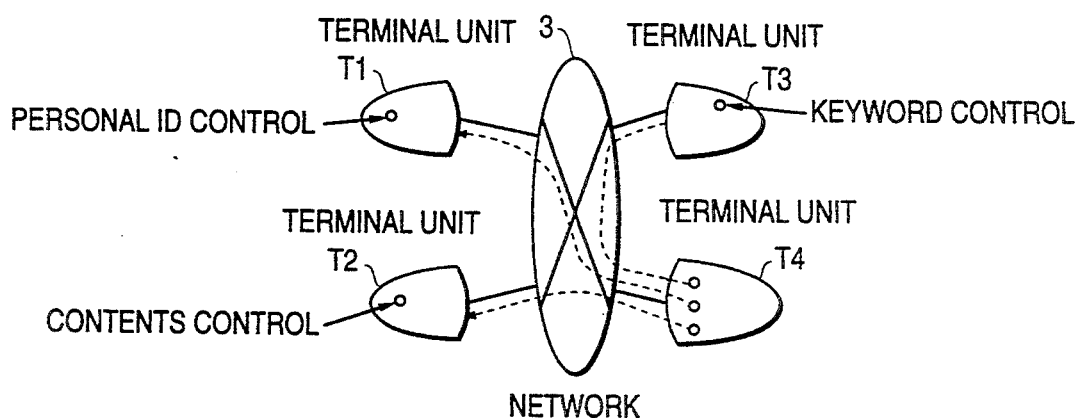
FIGS. 15B, 15C, 15D, 15E, 15F, 15G, 15H and 15I are diagrams for explaining each processing content of distribution control by the structure of an embodiment.

As shown in FIG. 15B, the terminal units T1, T2 and T3 respectively declare to become the control centers for personal ID, contents and keywords and gather the corresponding information.

Figure 15C:
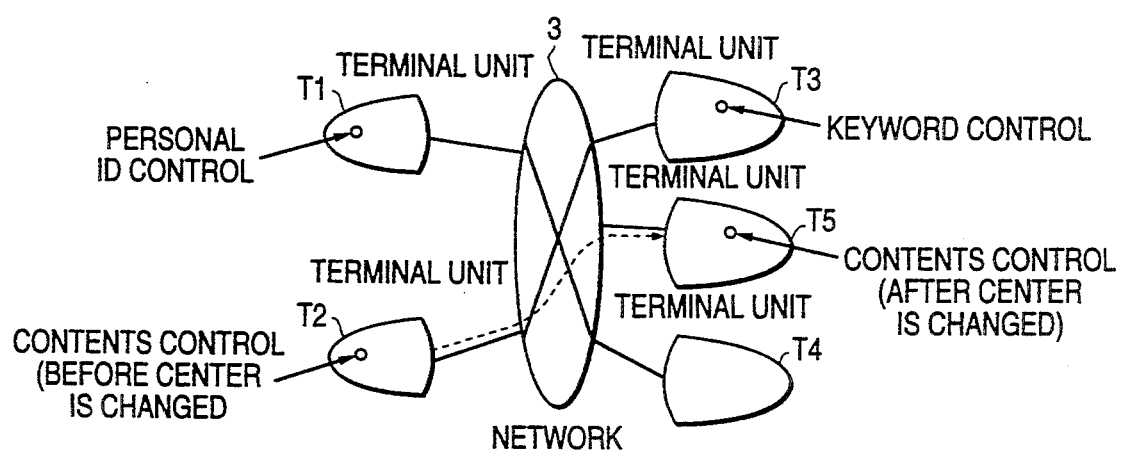
Figure 15E:
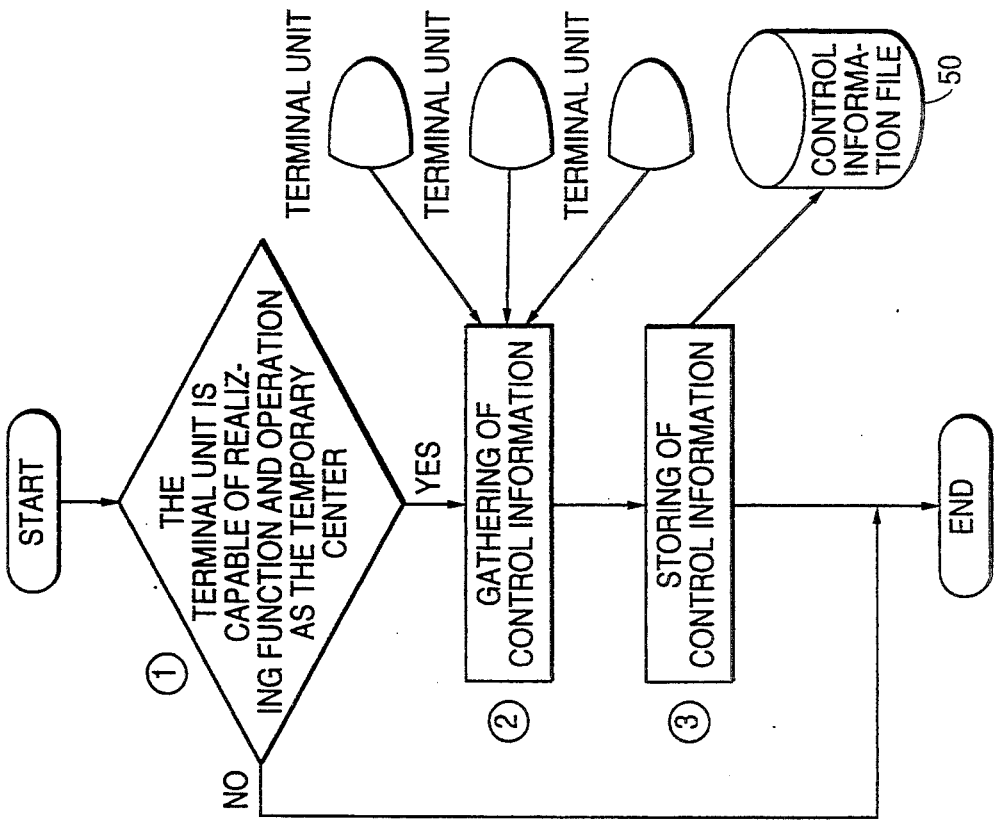

This processing is carried out as shown in FIG. 15E.

① A system control person inputs instruction for establishing control center by designating the items for control information to the relevant terminal unit 1. The relevant terminal unit 1 checks, corresponding to such instruction, whether the self terminal unit has the function as the control center or not, namely whether it is provided with the control information processing part 11 or not. When it is not provided with the control information-processing part 11, processing is terminated.

② When the control information processing part 11 is provided, the center declaration processing part 10a declares that the terminal unit 1 is the control center for relevant items and gathers relevant items through the network 3.

③ The center declaration processing part 10b stores the gathered information into the control information file 11 and establishes the control center.

As shown in FIG. 15B, when the one terminal unit becomes the control center only for one item, concentration of load may be avoided.

Next, alteration of control center will be explained.

The alteration of control center indicated as an example in FIG. 15C is for example carried out in such a manner that the contents control center is altered to T5 to T2.

Figure 15D:
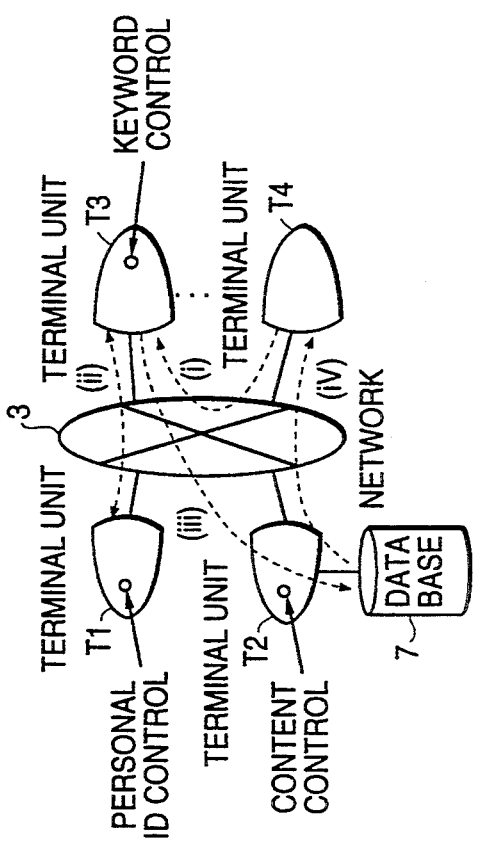
Figure 15G:
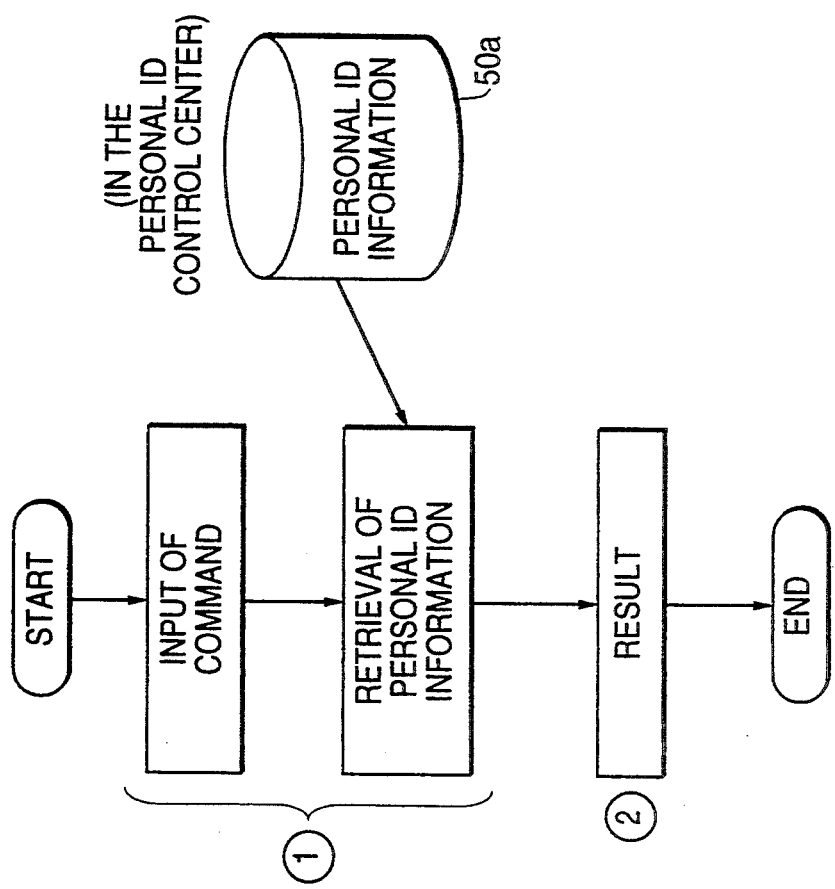
Figure 15F:
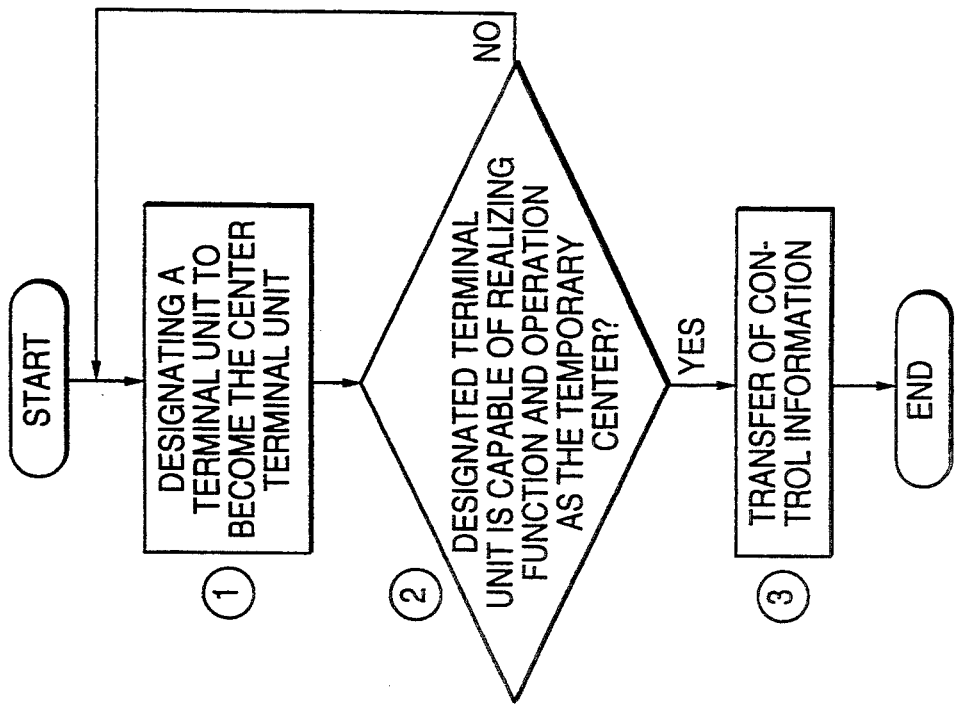

This processing is carried out following the processing flow of FIG. 15F in the center alteration processing part 10c of the terminal unit T2.

① The system control person inputs an instruction for alteration of control center by designating the terminal unit T5 to become the control center to the terminal unit T2.

② The center alteration processing part 10c checks whether the terminal unit T4 is provided with the function as the control center or not through the network 3.

When the terminal unit T5 is not provided with the function as the control center, it is displayed for the system control person and the processings of item 1 and subsequent processings are repeated.

③ When the terminal unit T5 is provided with the function as the control center, contents of control informtion file 11 for contents is transferred to the terminal unit T5.

The control information processing part 10c of terminal unit T5 is provided with a control information file 11 for contents to store the transferred contents and establish a new control center.

In case the terminal unit 1 (for example, T1), which is already functioning as the control center, is designated as the terminal unit to become the center next, the control information processing part 10 of such terminal unit T1 can reject the transfer.

Next, reference to the data base 2 will be explained. As shown in FIG. 15D, a user of terminal unit T4 inputs a personal ID, command and keyword (or contents) of data base 2 to the self terminal unit T4. Since the keyword is input, the terminal unit T4 notifies (i in the figure) the self terminal unit number together with the keyword, command and personal ID to the terminal unit T3 operating as the control center of keyword through the network 3.

The terminal unit T3 requests retrieval of personal ID information through the network 3 to the terminal unit T1 operating as the personal ID control center together with the command, personal ID and self terminal unit number and receives the result of retrieval (ii in the figure).

The retrieval processing part 10b of terminal unit T1 executes following processings shown in FIG. 15G.

① A self control information file 11 of personal ID is retrieved in accordance with input of command.

② As a result of retrieval, the label/level of personal ID is notified to the terminal unit T3 by the terminal unit number through the network 3.

The terminal unit T3 retrieves the self control information file 11 for keyword using a keyword, then checks the qualification of a personal ID accessed and then requests retrieval to the terminal unit T2 where the data base detected as the result of retrieval through the network 3 (iii in figure).

The terminal unit T2 having received the request retrieves the relevant data base 11 and sends it to the access issuing terminal unit T4 in place of the terminal unit T3 through the network (iv in figure). The terminal unit T2 does not execute the processing in this case as the contents control center.

Figure 15H:
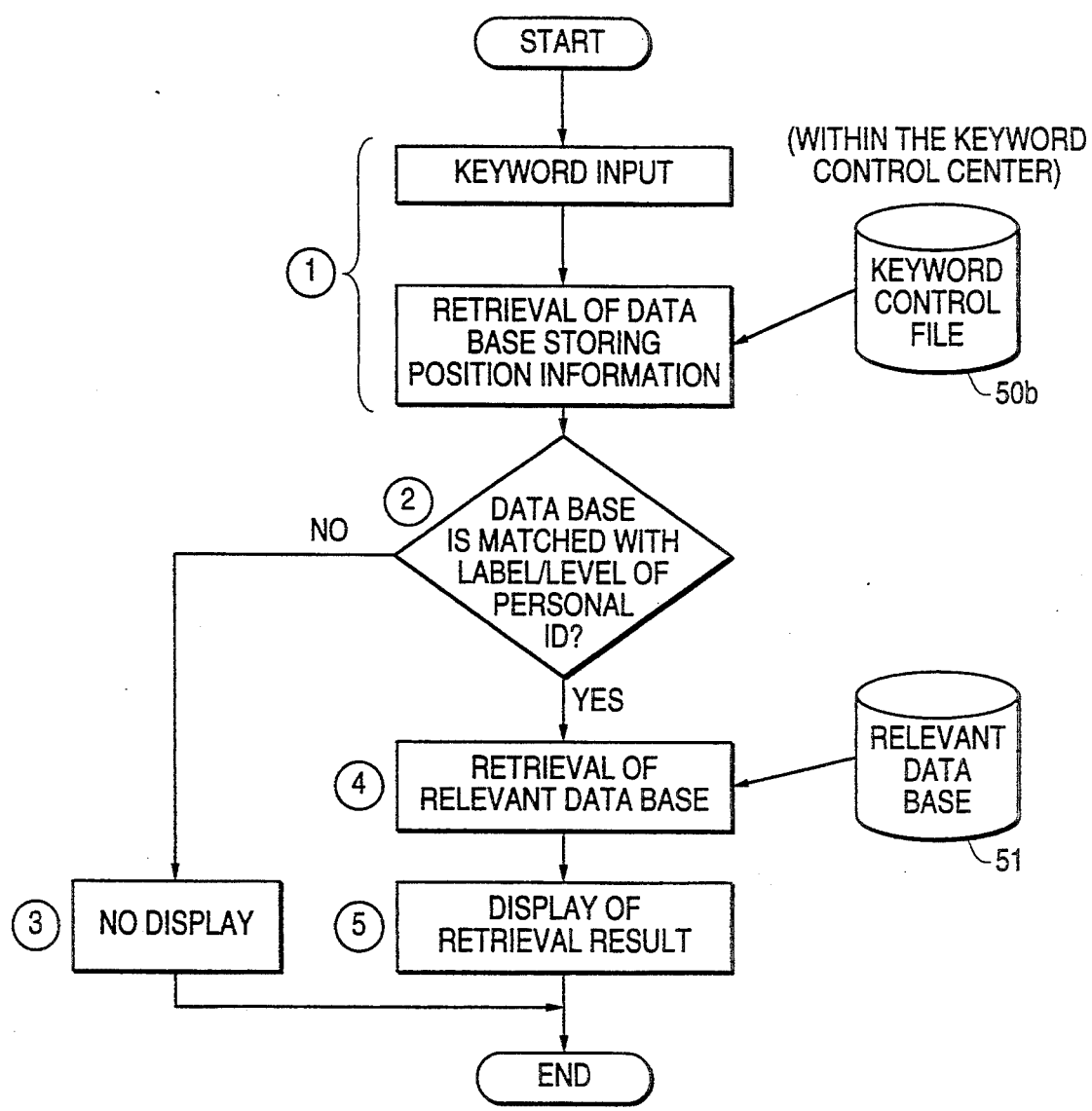

Operations of FIG. 15D are executed by the processing flow shown in FIG. 15H and will be explained hereunder.

① In accordance with input of keyword, the retrieval processing part 10b of terminal unit T3 retrieves self control information file 11 for keyword and detects the storing position and label/level of the data base 2 corresponding to relevant keyword.

② The relevant retrieval processing part 10b collates the label/level of the data base 2 with that of the personal ID obtained from the terminal unit T1 and checks the qualification.

③ In case the qualification is not satisfied (label/level is not matched), the retrieval processing part 10b notifies it to the terminal unit T4 with the terminal number through the network 3. In this case, contents of data base 2 are not displayed on the terminal unit T4 and processing is completed.

④ In case the qualification is satisfied, the retrieval processing part 10b notifies the storing position of data base 2 and terminal unit number of the access issuing terminal unit T4 through the network 3.

The terminal unit T2 retrieves the relevant data base 2 in accordance with the storing position.

⑤ The terminal unit T2 sends the data base 2 retrieved on the basis of the terminal unit number to the terminal unit T4 through the network 3. Thereby, contents of data base 2 to be referred are displayed on the access issuing terminal unit T4.

Moreover, in case a user designates data base 2 on the basis of contents in the place of the keyword, the following processings are executed.

First, the terminal unit T4 notifies contents, command, personal ID and self terminal unit number to the terminal unit T2 operating as the contents control center through the network.

The terminal unit T2 accesses the terminal unit T1 as the personal ID center in order to get the personal ID information.

Moreover, the terminal unit T2 retrieves the self control information file 11 for contents, checks qualification of personal ID, and also retrieves the data base 2 since it exists in the self terminal unit T2 and then sends it to the terminal unit T4.

Figure 15I:
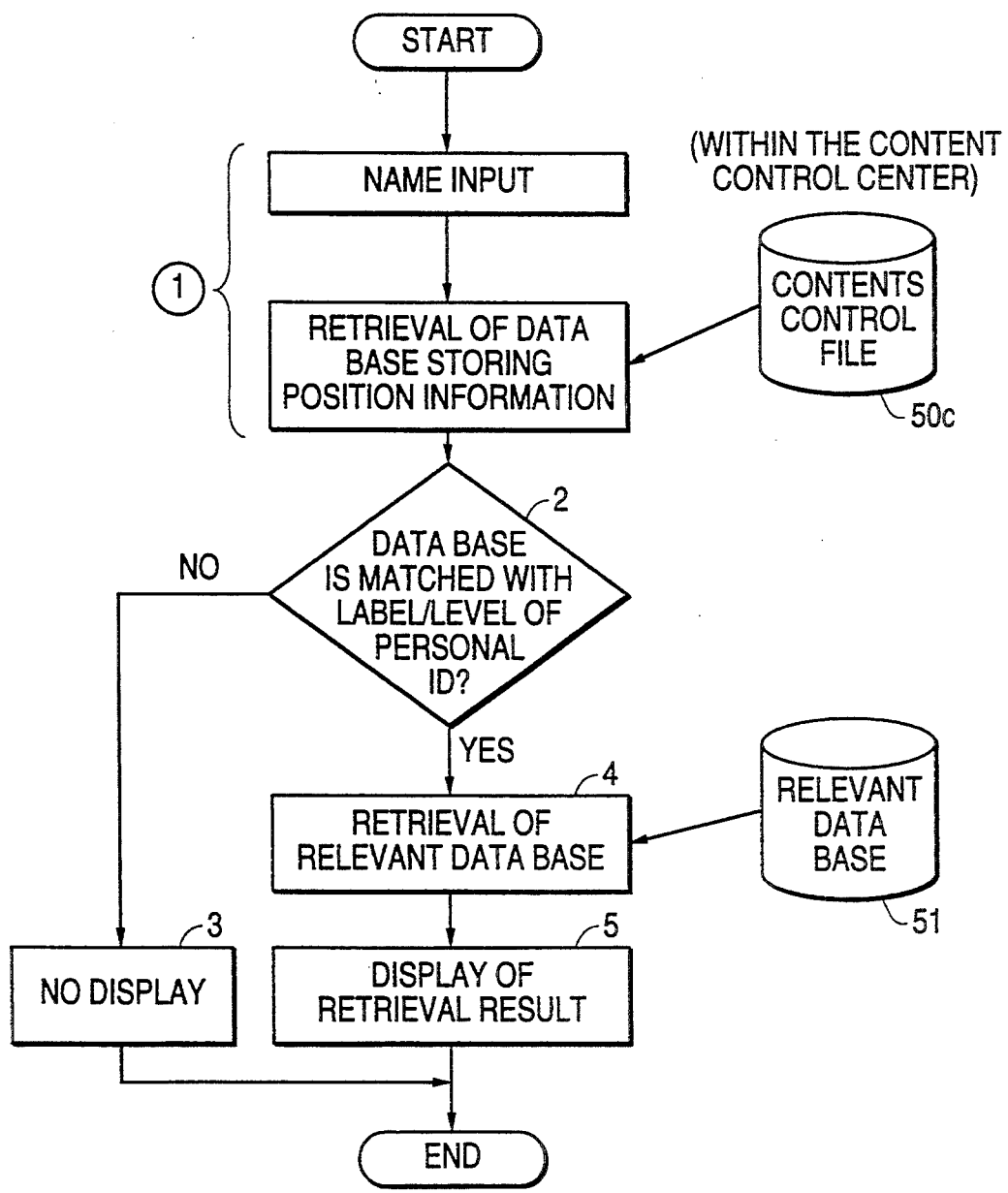

The processing flow for designation by contents is shown in FIG. 15I.

① In accordance with input of the contents (name), the retrieval processing part 10b of terminal unit T2 retrieves the self information file 11 for content control to know the storing position and label/level of the data base 2 corresponding to relevant contents.

② The retrieval processing part 10b collates label/level of data base 2 with that of personal ID obtained from the terminal unit T1 and checks the qualification.

③ When the qualification is not satisfied, it is notified to the terminal unit T4, completing the processing.

④ When the qualification is satisfied, the retrieval processing part 10b asks the self terminal unit T2 containing the data base 2 for retrieval thereof. The terminal unit T2 retrieves the data base 2 from the storing position.

⑤ The terminal unit T2 transmits the data base 2 retrieved by the terminal unit number to the terminal unit T4 through the network 3. Thereby, contents of the data base 2 to be referred are displayed on the access issuing terminal unit T4.

As explained above, the data base control function may be distributed to a plurality of terminal units and the terminal units having such function may also be altered in the distributed data base system of the present invention. Therefore, concentration of load only to one control center can be prevented and the risk that data base cannot be used during failure can also be prevented.

APPLICABILITY IN INDUSTRY

The temporary center system of the distributed data base system by the present invention is just suitable for effective realizing quick access to data while a load on the network is reduced in various businesses utilizing a large amount of data as the common resources by a distributed data base system connected to the network such as public network, for examples, information processing, information offering service or various businesses dealing with data.

By forming a data base through the grouping, the data base in the group can be used effectively by the distributed data base system grouping the offices and incorporated sections distributed in wide area through the network.

Moreover, the terminal units (or individuals) which access data base are limited within a certain range. Therefore, there is security and data can be protected. Therefore, opening of data may be accelerated. Moreover, the center having the control function of the distributed data base system is shared by various terminal units, and the load on each terminal unit is not centralized.

What is claimed is:

1. A distributed data base system connected to a network, comprising:
    a plurality of terminal units connected to the network, wherein one of terminal units connected to the network is set as a center for controlling contents;
    a data offering terminal unit which opens detail data to other terminal units, stores the detail data generated in a file and notifies the content control center of the contents and terminal unit identification information,
    said content control center registers contents notified from the data offering terminal unit to a contents file and controls the detail data; and
    a user terminal unit which requests the contents from said center when the user terminal requires detail data, wherein:
    when only one is selected from contents obtained, the user terminal unit accesses the data offering terminal unit, and the data offering terminal unit retrieves detail data corresponding to contents requested from the user terminal unit and transmits detail data to the user terminal unit;
    the content control center is provided with a content list table containing information for reading opened data, a reading condition table including open data items and a first rank designated for the open data items and a control information table including the identification information of first terminal units which can read open data and the second rank granted to the second terminal units;

when reading request is issued from the terminal units designating said identification information and data, said first and second ranks are collated from said reading condition table and control information table and reading of said contents list table is allowed to at least one of first and second terminal unit; and wherein the first terminal units and the second terminal units can be at least one of the data offering unit or the user terminal unit.

2. A distributed data base system connected to a network, comprising:

a plurality of terminal units connected to the network, wherein one of terminal units connected to the network is set as a center for controlling contents;

a data offering terminal unit which opens detail data to other terminal units, stores the detail data generated in a file and notifies the content control center of the contents and terminal unit identification number, said content control center registers contents notified from the data offering terminal unit to a contents file and controls the detail data; and a user terminal unit which requests the contents from said center when the user terminal requires data, wherein:

when only one of the terminal unit identifier number is selected from contents obtained, the user terminal unit accesses the data offering terminal unit, and the data offering terminal unit retrieves detail data corresponding to contents requested from the user terminal unit and transmits detail data to the user terminal units;

a group is formed with a predetermined plurality of terminal units in the terminal units connected to the network and the content control center for controlling data distributed and stored in the group is also provided, said content control center retrieving the distributed data bases on the basis of the request issued from the terminal units of said group;

a request issuing terminal unit makes reference to said data bases which must be distributed and stored on the basis of the result of said retrieval;

a plurality of groups formed by said predetermined terminal units provide plural numbers and content control centers for controlling the data bases distributed and stored in respective groups; and an intergroup control terminal unit for controlling said plural data bases distributed and stored is provided wherein:

said each content control center retrieves the data base within the group on the basis of the request from the terminal unit within the group to which each content control center belongs;

said intergroup control terminal unit retrieves the data base belonging to the group other than the group to which said content control center belongs on the basis of the request from each content control center; and the terminal unit which has issued a request makes reference to the data base of the group other than that to which relevant terminal unit belongs on the basis of the result of retrieval by said intergroup control terminal unit.

* * * * *

UNITED STATES PATENT AND TRADEMARK OFFICE
CERTIFICATE OF CORRECTION

PATENT NO. : 5,408,608
DATED : April 18, 1995
INVENTOR(S) : Tadamitsu RYU et al.

It is certified that error appears in the above-indentified patent and that said Letters Patent is hereby corrected as shown below:

Colume 28, Claim 1, line 3, after "units" insert --including first terminal units and second terminal units--.

Signed and Sealed this

Twenty-fifth Day of July, 1995

BRUCE LEHMAN

*Attest:*

*Attesting Officer*     *Commissioner of Patents and Trademarks*